(12) United States Patent
Marshall

(10) Patent No.: US 11,631,091 B2
(45) Date of Patent: Apr. 18, 2023

(54) SYSTEMS AND METHODS FOR MEASURING TRAFFIC DENSITY IN A REGION

(71) Applicant: SHOPIFY INC., Ottawa (CA)

(72) Inventor: Brent Marshall, Kitchener (CA)

(73) Assignee: SHOPIFY INC., Ottawa (CA)

( * ) Notice: Subject to any disclaimer, the term of this patent is extended or adjusted under 35 U.S.C. 154(b) by 47 days.

(21) Appl. No.: 16/882,636

(22) Filed: May 25, 2020

(65) Prior Publication Data

US 2021/0365961 A1   Nov. 25, 2021

(51) Int. Cl.
| G06Q 10/00 | (2023.01) |
| G06Q 30/0201 | (2023.01) |
| G01S 13/04 | (2006.01) |
| G06Q 10/0637 | (2023.01) |

(52) U.S. Cl.
CPC .......... *G06Q 30/0201* (2013.01); *G01S 13/04* (2013.01); *G06Q 10/0637* (2013.01)

(58) Field of Classification Search
None
See application file for complete search history.

(56) References Cited

U.S. PATENT DOCUMENTS

| 2006/0200378 A1* | 9/2006 | Sorensen | G06Q 30/02 |
| | | | 705/7.29 |
| 2006/0231724 A1* | 10/2006 | Gosis | G12B 13/00 |
| | | | 248/544 |
| 2009/0131080 A1 | 5/2009 | Nadler et al. | |
| 2013/0226655 A1* | 8/2013 | Shaw | G06Q 30/0201 |
| | | | 705/7.29 |
| 2014/0172553 A1 | 6/2014 | Goulart | |
| 2014/0229224 A1* | 8/2014 | Appel | G06Q 10/06315 |
| | | | 705/7.12 |
| 2015/0206081 A1* | 7/2015 | Lee | H04N 5/23219 |
| | | | 705/7.13 |
| 2016/0358195 A1 | 12/2016 | Klaczkow | |
| 2017/0039579 A1* | 2/2017 | Thompson | G06Q 30/06 |
| 2018/0024352 A1 | 1/2018 | Singh et al. | |
| 2018/0231650 A1* | 8/2018 | Heitzmann | G01S 13/86 |
| 2019/0392220 A1 | 12/2019 | Maan et al. | |
| 2020/0160670 A1* | 5/2020 | Zalewski | G06Q 20/327 |
| 2020/0249337 A1* | 8/2020 | Darko | G01S 7/411 |
| 2020/0302510 A1* | 9/2020 | Chachek | G06V 20/52 |

(Continued)

OTHER PUBLICATIONS

S, Victoria, Retail Metrics and KPIs: Why and How to Track Them, Jul. 2, 2018, RubyGarage.org, https://rubygarage.org/blog/retail-kpis-and-metrics, p. 1-18. (Year: 2018).*

*Primary Examiner* — Joseph M Waesco

(57) ABSTRACT

Computer-implemented systems and methods for determining the value of display space in a retail store are provided. These values of display space are determined based on measured traffic densities in the retail store. Traffic density is used as a metric for real-world customer activity and customer patterns in the retail store. To determine traffic density, measurements are obtained from one or more sensors in the retail store, where the measurements include spatial information pertaining to a region of the retail store. Traffic density can provide a quantitative, accurate and unbiased metric with which to determine a value associated with displaying products in a region of the retail store.

28 Claims, 13 Drawing Sheets

(56) References Cited

U.S. PATENT DOCUMENTS

2020/0334696 A1* 10/2020 Ansari .................... H04W 4/33
2020/0334835 A1* 10/2020 Buibas .................... G06T 7/248
2021/0027246 A1*  1/2021 Rana ...................... G06Q 50/30
2021/0235224 A1*  7/2021 MacDonald-Korth .......................
                                                    G06Q 30/0261
2021/0374661 A1* 12/2021 Bronicki ................ G06V 20/00

* cited by examiner

E-Commerce Platform

Search | John's Apparel / JG Jonny B. Good

- 🏠 Home
- ➡️ Orders
- 🏷️ Products
- 👥 Customers
- 📊 Reports
- ⚙️ Discounts
- ➕ Apps SALES CHANNELS ⊕
- 🏪 Online Store
- 📱 Mobile App View all channels ⚙️ Settings

Good afternoon, Jonny B..
Here's what's happening with your store today.

Today's total sales  Today's visits
$98.00                1

- Update your Platform Payments tax details
  We require additional information to verify your identity.
  [Update tax details]

- Advanced Cash on Delivery has been deactivated for your store
  [See why]

All channels ⌄ | Today ⌄

TOTAL SALES
$98.00                    Jun 1
                              2 orders $125
$75
$25
     12am   8pm   4pm   11pm

TOTAL SALES BY CHANNEL  View dashboard

Online Store              Jun 1
$0.00                         0 orders

Mobile app
$0.00                         0 orders

Shopify POS (126 York St.)
$0.00                         0 orders

FIG. 2

SYSTEMS AND METHODS FOR MEASURING TRAFFIC DENSITY IN A REGION

FIELD

The present application relates generally to measurement of traffic densities, and in particular embodiments, to measuring the traffic density of a region.

BACKGROUND

Some commercial locations include display space that is sold (or leased) to other individuals or entities. Retail stores are an example of this. An owner of a retail store may sell some or all of the display space within the store to a merchant that can then use the display space to advertise and/or sell their products. In some cases, the display space may include shelf space where physical products can be displayed to customers. The merchant can benefit from any sales of the products that occur through the retail store.

SUMMARY

From the perspective of a merchant that is interested in purchasing (or leasing) display space in a retail store, not all regions of the retail store are equally desirable. As such, the value of display space in different regions of a retail store is generally not fixed. Determining the value of display space in a manner that is reliable, accurate and unbiased remains a challenge. Indeed, the value of display space in a region of a location, such as a region of a retail store, is difficult to quantize. In some embodiments of the present disclosure, the value of display space in a region of a retail store is determined based on a measured quantity of traffic in the region, which is also referred to herein as a "traffic density". The traffic density is determined based on a series of measurements that are obtained by one or more sensors. The measurements include spatial information that may indicate the presence of customers and/or shopping carts in the region, for example. The actions of customers in the region, such as the amount of time they spend in the region and the number of interactions with products that they have in the region, can also or instead be derived from the measurements. Advantageously, traffic density can provide a quantitative, accurate and unbiased metric with which to determine a value associated with displaying products in a region.

According to one aspect of the present disclosure, a computer-implemented method is provided. The method includes obtaining measurements from at least one sensor, where the measurements include spatial information pertaining to a region of a retail store. In some embodiments, the spatial information includes at least one of a position, a shape and a speed of an entity in the region. The spatial information may also include three-dimensional information. Based on the measurements, a traffic density associated with the region is determined. The method further includes determining, based on the traffic density, a value associated with displaying products in the region.

This method can be performed for multiple regions in the retail store. Accordingly, in some embodiments, the region is a first region, the traffic density is a first traffic density and the value is a first value. The measurements can include spatial information pertaining to a plurality of regions of the retail store, the plurality of regions including the first region and a second region. Further, the computer-implemented method includes determining, based on the measurements, a second traffic density associated with the second region. The first value can be determined by comparing the first traffic density to the second traffic density. The method can also include determining, based on the second traffic density, a second value associated with displaying products in the second region.

In some embodiments, determining the traffic density can include at least one of: determining a number of persons that enter the region over a period of time; determining an average time that a person spends in the region; determining a number of shopping carts that enter the region over the period of time; and determining a number of persons that interact with products in the region over the period of time.

The at least one sensor may be adjustable to achieve various different capabilities. In some embodiments, obtaining the measurements from the at least one sensor includes: obtaining, from the at least one sensor, a first measurement of an entity that is in the region; adjusting the at least one sensor based on the first measurement; and after adjusting the at least one sensor, obtaining a second measurement of the entity. Adjusting the at least one sensor can include adjusting a resolution of the at least one sensor.

In some embodiments, prior to obtaining the measurements, the method includes obtaining initial measurements from the at least one sensor when no persons are present in the region of the retail store, the initial measurements including initial spatial information pertaining to fixed structures within the region. This can be considered an initial calibration step for the at least one sensor in the retail store. Determining the traffic density associated with the region may then be based on the initial measurements.

In some embodiments, obtaining the measurements includes obtaining radio wave measurements. For example, the at least one sensor may be a radar sensor.

In some embodiments, the method further includes outputting the value and/or the traffic density for display on a user interface with a representation of the region of the retail store. This can allow a user to view the value and/or the traffic density.

In some embodiments, the method further includes obtaining, from a user interface, a modification to the value. Based on the modification, a modified value associated with displaying products in the region can be generated. This allows users to adjust the values of display space in the retail store.

The regions of the retail store may be user selected. As such, in some embodiments, the method further includes obtaining, from a user interface, an indication of a boundary of the region of the retail store.

According to another aspect of the present disclosure, there is provided a system including a memory to store measurements, and one or more processors to perform any method as disclosed herein.

BRIEF DESCRIPTION OF THE DRAWINGS

Embodiments will be described, by way of example only, with reference to the accompanying figures wherein:

FIG. 2 is an example of a home page of an administrator, according to one embodiment;

DETAILED DESCRIPTION

For illustrative purposes, specific example embodiments will now be explained in greater detail below in conjunction with the figures.

Example e-Commerce Platform

In some embodiments, the methods disclosed herein may be performed on or in association with a commerce platform, which will be referred to herein as an e-commerce platform. Therefore, an example of an e-commerce platform will be described.

Figure 1:
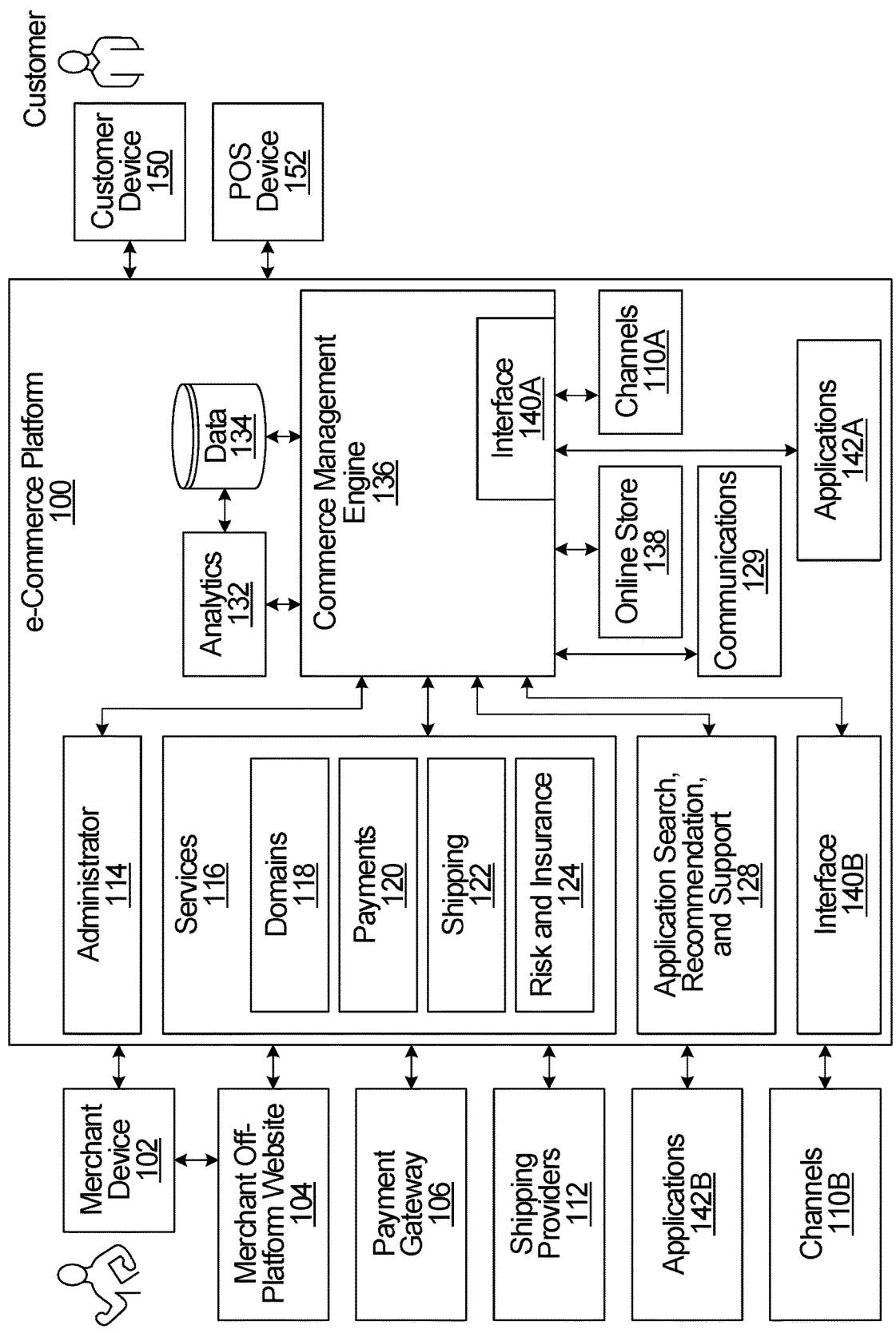
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Managing Display Space Using an e-Commerce Platform

Retail merchants are merchants that own and/or operate a retail store, which may be a physical or "brick and mortar" store that customers can physically visit to purchase products. Retail stores typically include shelf space to display products. As used herein, shelf space refers to any space in a retail store that can be used to display a product. Shelf space is not limited to physical shelves, and more generally includes floor space, walls, bins, racks, cabinets and any other means for displaying products in a retail store. Retail stores may also include advertising space or signage space, in which advertisements for products and/or services can be displayed to customers inside of and/or outside of the retail store. Non-limiting examples of advertising space include wall or window space to display signs or posters, ceiling space to hang banners, and floor space to present product demonstrations. The term "display space" is used to encompass both shelf space and advertising space. Display space can be quantified as a two-dimensional (2D) or three-dimensional (3D) space.

Retail stores that are implemented using virtual reality (VR) or augmented reality (AR) are also contemplated. AR or VR retail stores can include virtual shelf space or advertising space for products.

Retail merchants might use the display space in their retail stores to sell and/or advertise their own products, but this is not always the case. Instead, retail merchants may sell (or lease) display space within their retail stores to product merchants. Product merchants are merchants that design, manufacture, procure or otherwise obtain products to be sold to customers. To sell these products, the product merchants might use an online store, a retail store, or a combination thereof. Retail stores have the advantage that customers can physically interact with a product and the product can be displayed alongside other related products. However, there is typically a relatively large cost associated with owning and managing a retail store, and many product merchants cannot justify such a cost. Accordingly, product merchants may opt to purchase (or lease) display space in a retail store that is owned by a retail merchant. In some cases, even if a product merchant owns their own retail store, they might choose to further expand sales by purchasing display space in another retail store.

The cost of purchasing display space within a retail store may be referred to as "slotting fees" or "slotting allowances". After purchasing display space within a retail store, a product merchant can display their products and/or advertisements in this display space and profit from any sales of the products made through the retail store. Benefits of this approach for the product merchant may include:

Reducing or removing the cost associated with owning and managing a retail store;

Having products displayed in a retail store that has established customers; and

Having products displayed alongside similar products.

By way of example, a grocery store may be a retail store that sells display space to product merchants to display and sell their products.

Display space in retail stores can be a limited and desired commodity for merchants. In general, the value of display space is not equal across different regions of a retail store. For example, a product may exhibit better sales when displayed in a first region of a retail store compared to a second region of the same retail store. The first region may be in a popular location of the retail store that receives a relatively large amount of customer attention, whereas the second region may be in a remote location of the retail store that receives little customer attention. Determining the value of display space for different regions of a retail store can be a challenge for retail merchants.

Figure 3:
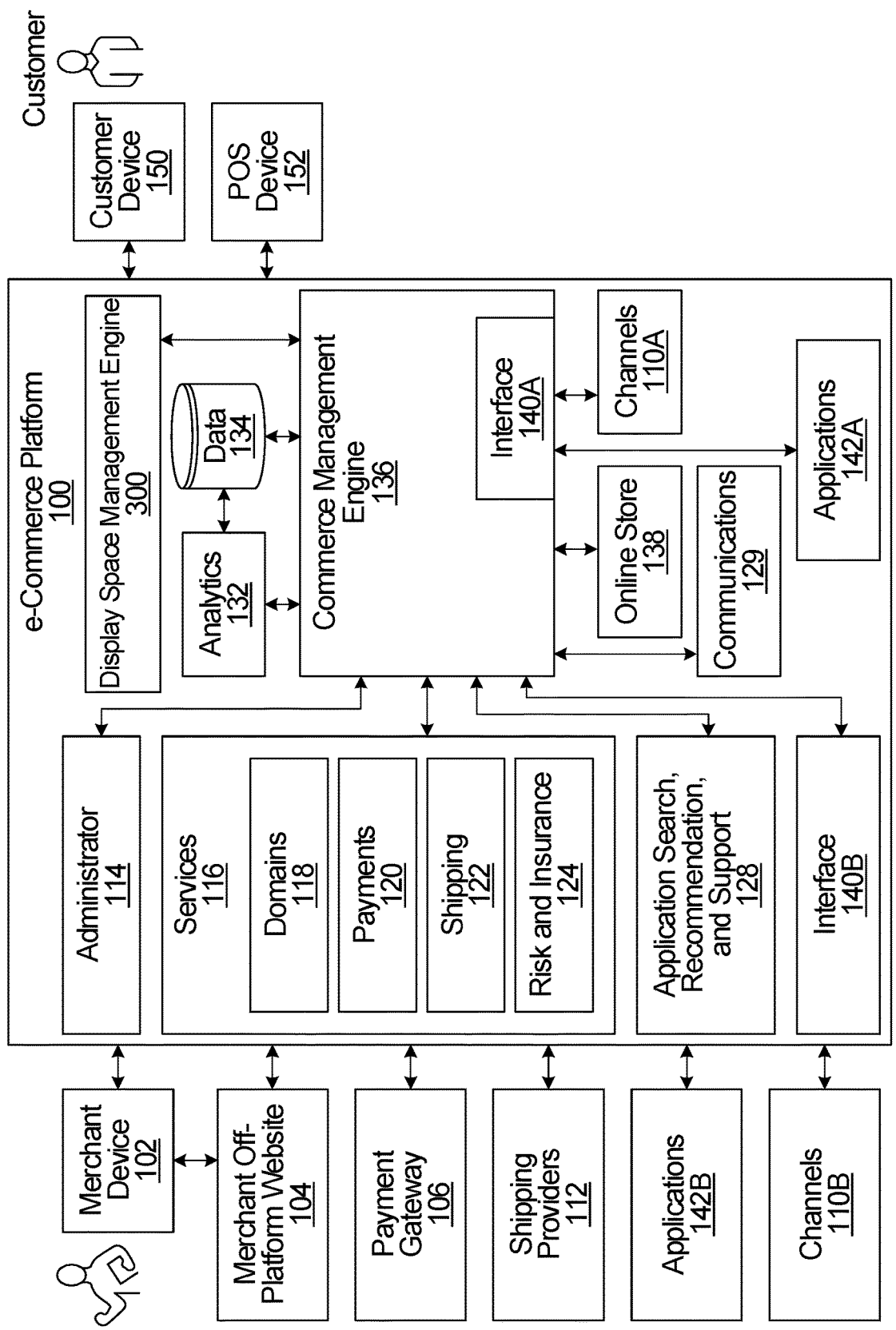
FIG. 3 illustrates the e-commerce platform of FIG. 1, but including a display space management engine.

The e-commerce platform 100 of FIG. 1 can be configured to generate or otherwise determine a value associated with displaying products in a region of a retail store. FIG. 3 illustrates the e-commerce platform 100, but including a display space management engine 300. The display space management engine 300 is an example of a computer-implemented system for managing display space in a location (for example, a retail store), including but not limited to determining values of the display space in the location. In some cases, retail merchants may use the display space management engine 300 to determine the value of display space in multiple different regions of their retail store. The retail merchant could then determine a price that the display space in each region will be sold for. The retail merchant could also or instead use the determined value of display space to improve the layout of the retail store and/or improve product placement within the retail store. The display space management engine 300 can also be used by product merchants. For example, product merchants may use the display space management engine 300 to determine which retail stores and which regions of those retail stores are suitable to display their products. Other potential functionality of a display space management engine is discussed elsewhere herein.

Although the display space management engine 300 is illustrated as a distinct component of the e-commerce platform 100 in FIG. 3, this is only an example. A display space management engine could also or instead be provided by another component of the e-commerce platform 100. In some embodiments, either or both of the applications 142A-B provide a display space management engine that is available to merchants. Furthermore, in some embodiments, the commerce management engine 136 provides a display space management engine. The e-commerce platform 100 could include multiple display space management engines that are provided by one or more parties. The multiple display space management engines could be implemented in the same way, in similar ways and/or in distinct ways. In addition, at least a portion of a display space management engine could be implemented on the merchant device 102. For example, the merchant device 102 could store and run the display space management engine locally as a software application.

As discussed in further detail below, the display space management engine 300 could implement at least some of the functionality described herein. Although the embodiments described below may be implemented in association with an e-commerce platform, such as (but not limited to) the e-commerce platform 100, the embodiments described below are not limited to the specific e-commerce platform 100 of FIGS. 1 to 3. Moreover, embodiments described herein do not necessarily need to be implemented in association with or involve an e-commerce platform at all. Therefore, some of the embodiments below are presented more generally in relation to any display space management engine.

Evaluating Display Space in a Retail Store

Retail merchants have struggled to evaluate display space within their retail stores in a manner that is reliable, accurate and unbiased. Similarly, product merchants have struggled to determine how display space in a particular region of a retail store might meet their needs.

One method for determining the value of display space in a region of a retail store is estimating the popularity of the region with customers. More popular regions are generally those that are expected to be exposed to higher levels of customer traffic, and therefore display space in these regions may warrant a higher value. In some cases, the relative location of a region in a retail store may be used as an indication of the region's expected popularity. For example, a larger number of customers might enter a region that is central in the retail store, is near the entrance of the retail store, is near the end of an aisle, or is near a cashier. In contrast, a smaller number of customers might enter a region that is on the periphery of the retail store. Further, the vertical position of the region relative to the average height of a customer (for example, near eye level or above the customer's head) may also or instead be used as an indication of the region's expected popularity. However, estimating the value of display space in a region based on qualitative properties, rather than quantitative properties, may lead to biased and inaccurate evaluations of the display space. For example, the expected popularity of a region might not correspond to the actual real-world popularity of the region. Furthermore, before purchasing display space in a particular region of a retail store, a product merchant might want to view data that justifies the cost of the display space. Such data would generally not be available using the method described above.

Another method for determining the value of display space in a region of a retail store is to compare real-world product sales across different regions of the retail store. However, this method also has some significant drawbacks. For instance, sales of a product are highly dependent on the desirability of the product. Therefore, if a relatively undesirable product is displayed in a region of a retail store for a relatively long period of time, then this might artificially reduce the perceived value of this region for displaying products. The opposite may be true for relatively desirable products. As such, using this method, the desirability of the products that are displayed in different regions of a retail store can bias the value of display space in those different regions. In addition, sales data might include confidential information or personally identifiable information (PII), relating to customers and/or merchants, that a retail merchant is not permitted to share with a product merchant. Thus, the product merchant might not be able to view the data that justifies the cost of display space and as a result might be less inclined to purchase the display space.

In view of the foregoing, a need exists for systems and methods that can determine the value of display space in a location and improve upon the reliability and accuracy of conventional methods.

According to an aspect of the present disclosure, a value of displaying products in a region of a retail store is determined based on a measured traffic density in the region. Traffic density is used as a metric for real-world customer activity and/or customer patterns in the retail store. Traffic density may quantify or otherwise indicate the number of customers and/or shopping carts that a region of a retail store will be exposed to. Traffic density may also quantify or otherwise indicate the amount of engagement that an average customer has with products being displayed in a region of a retail store. It should be noted that traffic density is not limited to an amount of traffic per unit area or per unit volume. Traffic density can also include a total amount of traffic and/or an amount of traffic per unit time, for example. In some cases, regions with a high traffic density are regions in which a relatively large number of customers spend a longer amount of time compared to low traffic density regions. Accordingly, the sales of a product displayed in a high traffic density region are typically higher than the sales of the same product displayed in a low traffic density region. Using traffic density as a metric, the value of display space in a region of a retail store can be determined based on real-world data that does not include confidential information or PII.

Figure 4:
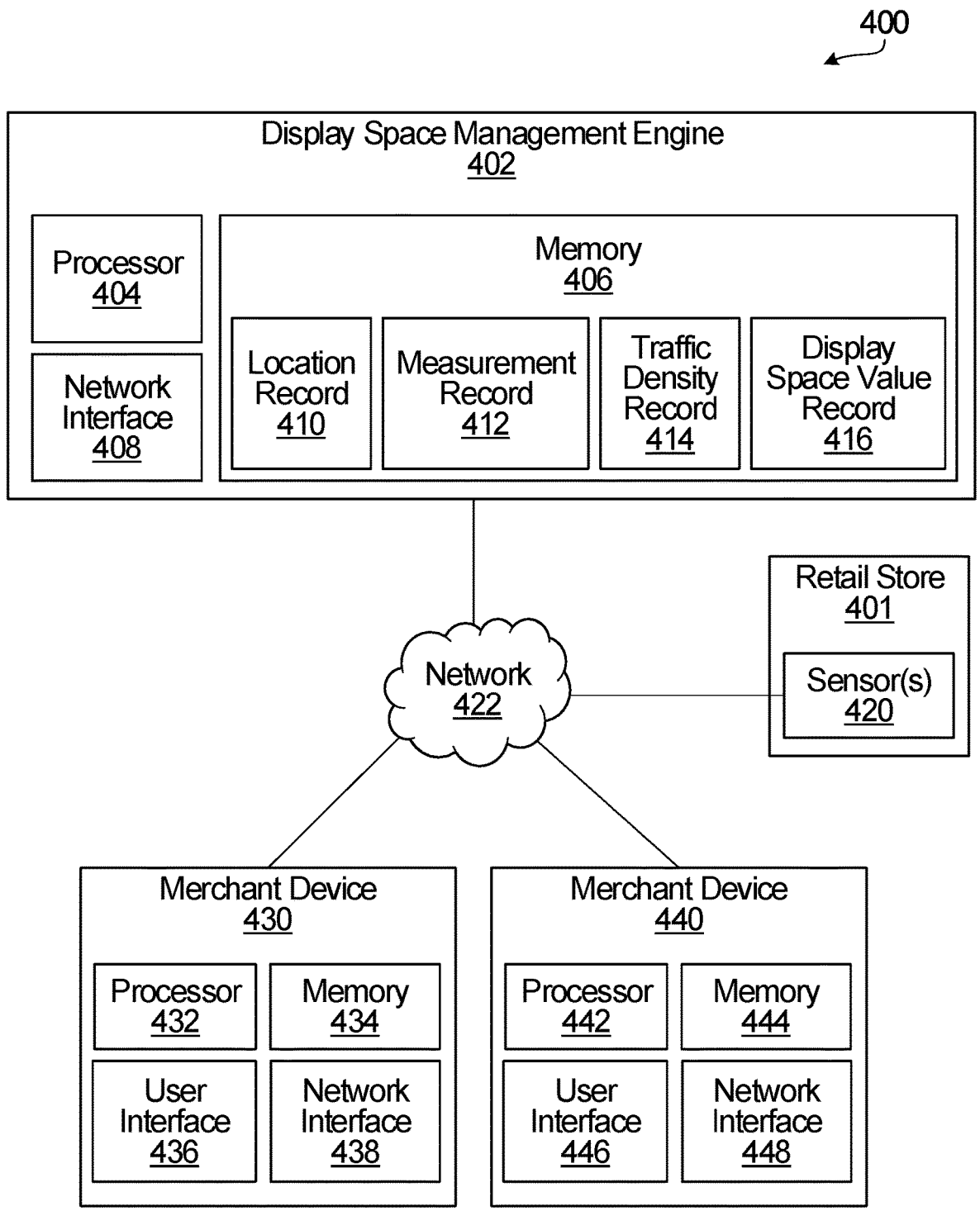
FIG. 4 is a block diagram illustrating a system for determining traffic densities and evaluating display space for a retail store, according to one embodiment.

Reference will now be made to FIG. 4, which is a block diagram illustrating an example system 400 for determining traffic densities and evaluating display space for a retail store 401. The retail store 401 includes several regions (not shown), each including 2D or 3D display space. A region could be defined by a shelf, a shelving unit, a wall area or a floor area of the retail store 401, for example.

It should be noted that the system 400 is in no way limited to use with the retail store 401 or even to retail stores in general. The system 400 can more generally be implemented for locations other than retail stores, including museums, stadiums and libraries, for example. The system 400 can also be used to determine traffic densities and evaluate display space for multiple locations in parallel. Furthermore, the system 400 is not limited to use with physical retail stores and can also be implemented for virtual products and/or virtual retail stores that are provided using augmented reality (AR) or virtual reality (VR), for example.

The system 400 includes a display space management engine 402, one or more sensor(s) 420, a network 422, and two merchant devices 430, 440. While FIG. 4 shows the sensor(s) 420 implemented inside of the retail store 401, and the display space management engine 402 and the two merchant devices 430, 440 implemented outside of the retail store 401, this is only an example. The display space management engine 402 and/or either or both of the merchant devices 430, 440 could instead be implemented at least partially inside of the retail store 401. Furthermore, at least some of the sensor(s) 420 may be implemented outside of the retail store 401.

The sensor(s) 420 are used to obtain measurements from the retail store 401. Various implementations of the sensor(s) 420 in the retail store 401 are contemplated. Moreover, a combination of multiple different sensor implementations could be used to gather more detailed measurements for the retail store 401. Non-limiting examples of different sensor implementations in the retail store 401 include:
  Implementing sensors on or in the ceiling of the retail store 401. This can provide a top-down view of the retail store 401, which might be best suited to generating a 2D spatial map of the retail store 401 (e.g., along a plane parallel to the ceiling of the retail store 401).
  Implementing sensors on or in the walls of the retail store 401. This can provide a side or lateral view of the retail store 401.
  Implementing the sensors at the junction between a wall and a ceiling in the retail store 401. This can obtain measurements of the retail store 401 from an oblique angle.

The measurements obtained by the sensor(s) 420 provide spatial and/or temporal information that can be used to determine traffic densities for one or more regions of the retail store 401. In order to accurately determine a traffic density, it might be desired that a sensor or collection of sensors have any, one, some or all of the following features and capabilities:
  Have a sufficient resolution to detect customers and distinguish between different customers. For example, the sensor should be able to distinguish between two customers that are walking side-by-side.
  Have a sufficient resolution to detect certain objects and distinguish between objects and customers. For example, the sensor should be able to distinguish between a shopping cart and a customer using the shopping cart.
  Have a sufficient resolution to detect certain actions performed by a customer, such as the customer reaching out to interact with a product on a shelf, for example.
  Have a sufficient range to detect customers and objects at various distances.
  Be capable of acquiring a 2D spatial map or layout for the retail store 401 that identifies any, some or all objects, customers and fixed structures within the retail store 401.
  Be capable of acquiring 3D spatial information for the retail store 401.
  Be capable of acquiring speed or velocity information to determine if a customer or an object is moving or is stationary.
  Be capable of tracking an object or customer through the retail store 401 over time.
  Be capable of acquiring biometric information for a customer, such as the heart rate or breathing rate of the customer, for example. This biometric information could provide an indication of a customer's mood and/or level of interest in a region of the retail store 401.
  Be capable of acquiring demographic information, such as gender or age, for example. This data could be used to divide traffic density data across different categories or segments of customers.
  Be adjustable or tunable to provide different capabilities. For example, the sensor could be adjustable to switch between obtaining low resolution (or coarse) measurements of multiple customers in a large area and obtaining high resolution (or fine) measurements of one customer in a smaller area.
  Avoid collecting any confidential information or PII. In some cases, PII can fall within certain regulations that limits how the information may be used. For example, visual images of customers within a retail store might be considered to contain PII. Avoiding the collection of any data containing PII can reduce the limitations imposed on the generation, storage and use of the data.
  Be relatively low-cost.
  Be easily implemented in the retail store 401.

The sensor(s) 420 may include one or more different types of sensors. Non-limiting examples of such sensor types include:
  Sensors that perform radio wave measurements, such as radar sensors, for example;
  Sensors that perform acoustic measurements, such as echolocation sensors, for example;
  Sensors that detect WI-FI signals from customer devices;
  Thermal sensors;

Lidar sensors; and

Foot traffic sensors.

In some implementations, radar sensors may provide any, one, some or all of the features and capabilities identified above. By way of example, the TI IWR6843 Single-Chip 60- to 64-GHz mmWave Sensor could be used as a radar sensor for determining traffic density. In some cases, a radar sensor emits a series of radio wave pulses in the 60-64 GHz frequency range. The pulses may be reflected off entities (for example, customers or objects) and be received by the radar sensor. The time-of-flight of the pulse can provide a measurement of an entity's distance from the radar sensor, and the Doppler shift of the pulse can provide a measurement of the entity's velocity. Further, the direction that the pulse is transmitted in, or received from, can provide a measurement of the entity's position relative to the radar sensor. Advantageously, radar sensors do not typically collect PII, and therefore can avoid the issues associated with PII discussed above.

A radar sensor might be sensitive to the type of material being detected, and in particular to the dielectric constant of the material. Materials with high dielectric constants (for example, metals) might reflect radio wave pulses relatively strongly and produce a high signal-to-noise ratio (SNR), whereas materials with lower dielectric constants (for example, hair) might reflect radio wave pulses relatively weakly and produce a low SNR. In general, clothing and human bodies reflect radio wave pulses to a medium degree.

Parameters of a sensor may be intermittently and/or continuously adjusted in order to vary the SNR, sensitivity, resolution and/or range of the measurements obtained by the sensor, for example. In the case of a radar sensor, the parameters that may be adjusted include threshold power for detection (for example, the minimum power of a reflected pulse that is recorded as the detection of an object), pulse power, pulse bandwidth, pulse duration, pulse chirp and pulse repetition rate, for example. However, there may be trade-offs associated with adjusting the parameters of a sensor. For example, improving the spatial or temporal resolution of a radar sensor may reduce the range of the radar sensor.

In some implementations, parameters of a sensor might be actively adjusted to achieve different measurement capabilities for different situations. For example, a radar sensor could be initially configured to obtain measurements over a relatively large range but with a relatively low resolution. Once an entity is detected, the radar sensor could then be adjusted to improve the measurement resolution in the region of the entity. This may help detect certain properties of the entity, such as if the entity is a customer or a shopping cart, the velocity of the entity and the shape of the entity, for example.

Although not illustrated in FIG. 4, one or more of the sensor(s) 420 may include or be connected to: memory for storing measurements and/or sensor parameters; a processor for processing measurements and/or adjusting sensor parameters; and a network interface for communicating over the network 422.

The display space management engine 402 performs operations related to managing display space. One such operation is determining traffic densities and evaluating display space in the retail store 401 based on measurements obtained from the sensor(s) 420. However, the display space management engine 402 can also perform other operations, including but not limited to:

Storing layouts, measurements, traffic densities and/or values of display space for various locations;

Outputting the layouts, measurements, traffic densities and/or values of display space to other devices such as merchant devices, for example; and Facilitating the purchase of display space.

In some implementations, the display space management engine 402 is provided within the retail store 401. However, the display space management engine 402 could instead be remote from the retail store 401. In some implementations, the display space management engine 402 is provided at least in part by an e-commerce platform, either as a core function of the e-commerce platform or as an application supported by the e-commerce platform. For example, the display space management engine 402 could be the display space management engine 300 of FIG. 3. In some implementations, the display space management engine 402 is implemented at least in part by a user device such as a merchant device. Other implementations of the display space management engine 402 are also contemplated. While the display space management engine 402 is shown as a single component in FIG. 4, the display space management engine 402 could instead be provided by multiple different components that are in communication via the network 422, for example.

The display space management engine 402 includes a processor 404, memory 406 and a network interface 408. The processor 404 may be implemented by one or more processors that execute instructions stored in the memory 406. These instructions could implement any method described herein. Alternatively, some or all of the processor 404 may be implemented using dedicated circuitry, such as an application specific integrated circuit (ASIC), a graphics processing unit (GPU) or a programmed field programmable gate array (FPGA).

The network interface 408 is provided for communication over the network 422. The structure of the network interface 408 is implementation specific. For example, the network interface 408 may include a network interface card (NIC), a computer port (e.g., a physical outlet to which a plug or cable connects), and/or a network socket.

The memory 406 includes a location record 410, a measurement record 412, a traffic density record 414 and a display space value record 416. In some implementations, the location record 410, the measurement record 412, the traffic density record 414 and the display space value record 416 are stored as one or more data structures in the memory 406. Non-limiting examples of such data structures include lists, arrays (of any dimension) and data trees.

The location record 410 stores information relating to the locations that are managed by the display space management engine 402. At least one of these locations is the retail store 401, but information relating to other retail stores, museums, stadiums and/or libraries may also be stored in the location record 410. For a given location, the information stored in the location record 410 may include, inter alia:

The address of the location;

The owner of the location (for example, the retail merchant associated with the retail store 401);

The purpose or function of the location (for example, is the location a retail store or a stadium);

A list of the different regions in the location and any display space available in each region;

The layout of the location, which may indicate the boundaries of each region in the location and/or the fixed structures in the location, for example; and Any product merchants that have purchased or leased display space in the location.

In some implementations, any, some or all of the information stored in the location record 410 may be provided by a merchant via a merchant device, for example. However, as discussed in further detail below, at least some of this information may be generated from measurements.

The measurement record 412 stores measurements for the locations listed in the location record 410. At least some of these measurements are obtained from the sensor(s) 420 and correspond to the retail store 401, but measurements from other sensors that correspond to other locations can also be stored in the measurement record 412. In some implementations, the measurements are transmitted from the sensor(s) 420 to the display space management engine 402 via the network 422. However, the network 422 might not be used to communicate measurements in all cases. For example, a direct wired or wireless communication link (not shown) between the display space management engine 402 and the sensor(s) 420 may allow measurements to be transmitted to the display space management engine 402 without the use of the network 422.

In some implementations, the measurements stored in the measurement record 412 include spatial information that indicates the position, shape and/or velocity of one or more entities in the retail store 401, including structural components, people and objects in the retail store 401, for example. Consider the case of measurements that are obtained from a radar sensor. These measurements can be stored as 2D or 3D spatial data points, which may also be considered spatial data points ("dots") within a 2D or 3D space. Each spatial data point corresponds to a measurement from the radar sensor. An area having a dense collection of spatial data points may indicate the presence of an entity, and an area having a sparse collection of spatial data points or no spatial data points at all may be an area of empty space. A spatial data point could also have an associated speed and/or velocity that was measured by the radar sensor.

Spatial information obtained from the sensor(s) 420 could be mapped to (or superimposed with) a layout of the retail store 401 that is stored in the location record 410. For example, spatial data points could be defined in terms of a coordinate system that corresponds to a coordinate system used to define the layout of the retail store 401. The mapping could determine the position of people and/or objects relative to the different regions of the retail store 401, for example. Further, the mapping could determine the position of people and/or objects relative to each other and to fixed structures in the retail store 401.

In some implementations, the measurement record 412 includes spatial information for the retail store 401 that was acquired when the retail store 401 is empty of any customers and/or products. Therefore, this spatial information may identify only the fixed structures within the retail store 401, such as the walls and shelves, for example. Using this spatial information, the layout of the retail store 401 can be determined and stored in the location record 410. The fixed structures within the retail store 401 can then be accounted for when obtaining future measurements.

In some implementations, the measurements stored in the measurement record 412 include temporal information that indicates the movement of one or more entities over time. For example, spatial data points that are collected over a period of time can be used to monitor and track the movement of a person or an object.

Raw measurements may be processed before they are stored in the measurement record 412. For example, in the case of a radar sensor, processing may be used to generate spatial data points from the time-of-flight, Doppler shift and direction of pulses received by the radar sensor. Algorithms (stored in the form of computer-executable instructions) for processing raw measurements may be stored by the memory 406 and/or by the sensor(s) 420. In some implementations, processing is performed by the sensor(s) 420 before measurements are transmitted to the display space management engine 402. As such, the measurements might be received in a form that is suitable for storage in the measurement record 412. Alternatively, at least some processing of the measurements may be performed by the processor 404 in the display space management engine 402.

Measurements can be intermittently and/or continuously received by the display space management engine 402 from the sensor(s) 420 and other sensors. As such, new measurements can be added to the measurement record 412 when they become available. In some implementations, older measurements may be deleted from the measurement record 412 when new measurements are received.

The traffic density record 414 stores traffic densities for the locations listed in the location record 410. At least some of these traffic densities correspond to the retail store 401, where each region of the retail store 401 can have a corresponding traffic density. However, traffic densities for other locations may also be stored in the traffic density record 414.

In some implementations, the traffic densities stored in the traffic density record 414 are determined by the display space management engine 402 based on the measurements stored in the measurement record 412. For example, the memory 406 can store algorithms (in the form of computer-executable instructions) for generating traffic densities from the measurements. These algorithms, which can be executed by the processor 404, obtain measurements from the measurement record 412 and analyse the measurements to calculate traffic densities. In some implementations, a traffic density is determined based on analysis of a large amount of measurement data originating from multiple sensors over a period of time. The determination of traffic density can be performed separately for each region of the retail store 401.

Analysis of the measurements in the measurement record 412 can detect the presence of a customer in a region of the retail store 401. For example, the presence of a customer could be determined based on the shape of a cluster of spatial data points in the region. The analysis could also determine a position and/or velocity of the customer and track the customer as they move through the retail store 401. Similar comments apply to detecting, locating and tracking other entities such as shopping carts, for example. The presence, position and/or velocity of the entities in the retail store 401 can be used to help determine traffic densities for the retail store 401.

The actions of a customer can also be determined through the analysis of the measurements in the measurement record 412. In some implementations, the actions of a customer are determined based on the position and/or movement of various anatomical features of the customer, non-limiting examples of which include the customer's torso, head, arms and legs. For example, a cluster of spatial data points might provide enough detail to determine which data points correspond to the torso, head, arms and legs of a customer. Once detected, various actions of a customer could be discerned through the movement of their anatomical features. As an example, the movement of a customer's arm towards a shelf in the retail store 401 could be interpreted as the customer interacting with a product. Using 3D spatial information, the analysis can determine the vertical height at which a customer is interacting with a product, which may allow traffic densities to be determined in 3D. Measurement analysis may also be able to detect various devices or objects that a customer is holding, which could be used to detect when a customer is picking up a product and adding that product to a shopping cart. The actions of a customer in a region of the retail store 401 can be used to help determine a traffic density in that region.

Improving the resolution of spatial data points may enable more accurate measurement analysis. For example, improving the spatial resolution could allow the position, velocity and/or actions of customers to be determined with a higher degree of accuracy.

In general, analysis of the measurements stored in the measurement record 412 can provide information that defines, or is used to determine, a traffic density for a region of the retail store 401. By way of example, traffic density in a region could be based on any, some or all of the following information:

- The number of customers that enter the region over a given period of time. In some cases, the number of customers that enter the region is normalized based on the total area or total volume of the region. For example, a number of customers per square meter could be determined for the region and used to define traffic density.
- The average time that a customer spends in the region. Customers might spend a longer amount of time in regions with many sought-after products, or regions that are spacious and/or visually pleasing compared to regions that are narrow, congested, dark or otherwise unappealing.
- The number of customer-product interactions within the region. Customer-product interactions could include customers stopping to look at products, picking up or otherwise manipulating products, and/or placing products in a shopping cart (or basket) within the region. Customer-product interactions may be counted over a period of time or averaged on a per customer basis, for example.
- The number of shopping carts that enter the region over a given period of time. The presence of a shopping cart may be an indication that the customer utilizing the shopping cart intends to purchase a product, intends to purchase multiple products, and/or intends to purchase bulkier products.
- Biometric information for customers in the region, which can provide an indication of a customer's mood and/or level of interest in the region.

In some implementations, measurement analysis can determine the age and/or other demographic information for one or more customers. This may be achieved by determining the height of the customers, for example. The traffic densities stored in the traffic density record 414 can then be divided across different categories or segments of customers based on this demographic information. For example, measurement analysis could determine that regions at a certain vertical height in the retail store 401 have a high traffic density for children, but less so for adults. This demographic information could be interesting to a product merchant that has purchased display space in a region at this height and is deciding what products to place in the display space. In view of the demographic information, the product merchant could choose to display products aimed at children.

Since traffic densities are determined, generated or calculated based on measurements stored in the measurement record 412, traffic densities in the traffic density record 414 can be intermittently or continuously updated as new measurements become available.

The display space value record 416 stores a display space value for each region of the locations listed in the location record 410. In some implementations, the values of display space are determined based on the corresponding traffic densities stored in the traffic density record 414. In the retail store 401, display space may be evaluated on a per-shelf basis or a per-rack basis. Alternatively, display space may be evaluated per unit area (for example, a 2D area on a shelf) or per unit volume, for example. The value of display space may be defined in terms of a price or cost of purchasing the display space, but this might not always be the case. Other metrics could be used to define or quantify the value of display space.

In some implementations, the memory 406 can store algorithms (in the form of computer-executable instructions) for generating values of display space. These algorithms, which can be executed by the processor 404, query the traffic density record 414 to obtain traffic densities and determine the corresponding display space values. Any of a variety of different approaches can be used to determine the display space values.

In some implementations, the value of display space is determined using a comparative approach. For example, the traffic densities for multiple regions can be compared, and the regions with higher relative traffic densities can be assigned a higher value of display space. Comparing the traffic densities of multiple regions is not limited to regions of a single location. For example, traffic densities for regions of multiple retail stores can be compared to perhaps more accurately determine appropriate values of display space.

In some implementations, the value of display space in a region is determined based on whether a traffic density for that region exceeds one or more thresholds. For example, thresholds could be defined in terms of the number of customers that enter the region; the average time that a customer spends in the region; the number of customer-product interactions in the region; and/or the number of shopping carts that enter the region. Each traffic density threshold that a region exceeds could increase the value of display space in that region by a predefined amount. The following is a non-limiting list of example traffic density thresholds:

- 100 customers entering the region on an average day;
- 200 customers entering the region on an average day;
- 500 customers entering the region on an average day;
- 1000 customers entering the region on an average day;
- The average customer spending 10 seconds in the region;
- The average customer spending 30 seconds in the region;
- The average customer spending 1 minute in the region;
- The average customer spending 2 minutes in the region;
- The average customer interacting with 1 product in the region;
- The average customer interacting with 2 products in the region;
- The average customer interacting with 5 products in the region;
- The average customer interacting with 10 products in the region;
- 100 shopping carts entering the region on an average day;
- 200 shopping carts entering the region on an average day;
- 500 shopping carts entering the region on an average day; and
- 1000 shopping carts entering the region on an average day.

The display space management engine 402 could determine values of display space for different locations and/or regions in the same way, but this might not always be the case. In some implementations, different locations and/or regions may have specific methods for analysing measurements, determining traffic densities and/or determining values of display space.

Although the location record 410, the measurement record 412, the traffic density record 414 and the display space value record 416 are illustrated as separate records, this is only an example. Some embodiments could combine these records as a single record or data structure. For example, a single data structure could store a layout, measurements, traffic densities and display space values for multiple locations.

The algorithms that are used by the display space management engine 402 to analyse measurements, determine traffic densities and determine values of display space could be implemented by one or more models stored in the memory 406. In some implementations, measurements from the measurement record 412 could be analysed multiple times by different models to provide more information for determining traffic densities and determining values of display space. By way of example, different models could use different thresholds for determining when a cluster of spatial data points corresponds to an object. A first model could have a relatively high threshold that is configured for reliably detecting the presence of customers, whereas a second model could have a relatively low threshold that is configured for detecting smaller objects such as a customer's hand. These two models could be used in conjunction, where the first model is used to detect a customer and the second model is used to better characterize the customer by detecting various anatomical features of the customer. A traffic density could be determined based on the outputs of both models.

In some implementations, machine learning (ML) models can be implemented by the display space management engine 402 to analyse measurements, determine traffic densities and/or determine values of display space. Possible inputs to the ML model include information from the location record 410, measurements from the measurement record 412 and/or traffic densities from the traffic density record 414. Possible outputs from the ML model include traffic densities and values of display space. An ML model could be implemented using any form or structure known in the art. Example structures for the ML model include but are not limited to:
- One or more artificial neural network(s);
- One or more decision tree(s);
- One or more support vector machine(s);
- One or more Bayesian network(s); and/or
- One or more genetic algorithm(s).

An ML model could be trained using data samples with traffic densities and/or display values that have been previously determined using other means. In some embodiments, the ML model is trained using information in the traffic density record 414 and/or the display space value record 416. The method used to train the ML model is implementation specific and is not limited herein. Non-limiting examples of training methods include:
- Supervised learning;
- Unsupervised learning;
- Reinforcement learning;
- Self-learning;
- Feature learning; and
- Sparse dictionary learning.

The merchant devices 430, 440 in the system 400 are examples of user devices. The merchant device 430 is associated with a retail merchant that owns the retail store 401 and the merchant device 440 is associated with a product merchant that is interested in purchasing display space in the retail store 401 and/or has already purchased display space in the retail store 401.

Either or both of the merchant devices 430, 440 may be a mobile phone, tablet, laptop, or computer, for example. The merchant device 430 includes a processor 432, memory 434, user interface 436, and network interface 438. Similarly, the merchant device 440 includes a processor 442, memory 444, user interface 446, and network interface 448. An example of a user interface is a display screen (which may be a touch screen), headset, a keyboard, and/or a mouse. The network interfaces 438, 448 are provided for communicating over the network 422. The structure of the network interfaces 438, 448 will depend on how each of the merchant devices 430, 440 interfaces with the network 422. For example, if the merchant device 430 is a mobile phone or tablet, the network interface 438 may include a transmitter/receiver with an antenna to send and receive wireless transmissions to/from the network 422. If the merchant device 430 is a personal computer connected to the network with a network cable, the network interface 438 may include, for example, a NIC, a computer port, and/or a network socket. Similar comments apply to the merchant device 440 and the network interface 448. The processors 432, 442 directly perform or instruct all of the operations performed by the merchant devices 430, 440, respectively. Examples of these operations include processing user inputs received from the user interfaces 436, 446, preparing information for transmission over the network 422, processing data received over the network 422, and instructing a display screen to display information. Either or both of the processors 432, 442 may be implemented by one or more processors that execute instructions stored in the memory 434, 444, respectively. Alternatively, some or all of the processors 432, 442 may be implemented using dedicated circuitry, such as an ASIC, a GPU, or a programmed FPGA.

Content can be communicated between the display space management engine 402 and the merchant devices 430, 440. This content can include any, some or all of the information that is stored in the location record 410, the measurement record 412, the traffic density record 414 and/or the display space value record 416. In some implementations, the display space management engine 402 and the merchant devices 430, 440 communicate via the network 422. However, a direct wired or wireless connection (not shown) could be established between the display space management engine 402 and either or both of the merchant devices 430, 440.

In some implementations, using the merchant device 430, the retail merchant provides any, some or all of the information in the location record 410. Consider, for example, a case in which the display space management engine 402 determines the layout of the retail store 401 using measurements from the sensor(s) 420 when no customers are present in the retail store 401. These measurements could detect or otherwise indicate the fixed structures in the retail store 401, which are used to determine the layout. The display space management engine 402 could then transmit the layout to the merchant device 430, which displays the layout to the retail merchant on a display screen. The retail merchant may be provided with options to define or delineate different regions in the layout of the retail store 401. These regions could be defined at any level of granularity, such as one region per shelf, one region per shelving unit, or one region per aisle, for example. These regions are then transmitted to the display space management engine 402 and stored in the location record 410 for the retail store 401. This may be considered a calibration step that occurs prior to measuring traffic densities in the retail store 401.

In some implementations, traffic densities (from the traffic density record 414) and recommended costs of display space (from the display space value record 416) for the retail store 401 can be transmitted to the merchant device 430 for display to the retail merchant. If the retail merchant agrees with the recommended costs, then the retail merchant can then accept the recommended costs. Alternatively, the retail merchant can adjust the recommended costs, in which case the adjusted costs are transmitted to the display space management engine 402 and stored in the display space value record 416. The retail merchant can use the traffic density data to help in their decision to accept or adjust the recommended costs.

Traffic densities (from the traffic density record 414) and costs of display space (from the display space value record 416) for the retail store 401 can also or instead be transmitted to the merchant device 440 for display to the product merchant. Advantageously, the traffic densities can be free of PII, which allows the traffic densities to be viewable by any product merchants (i.e., product merchants do not need to have special permissions to view PII). Based on the traffic densities and costs of display space, the product merchant can purchase new display space, renew an existing lease on display space or bid against other merchants for display space, for example. After purchasing display space in a particular region of the retail store 401, the product merchant can continue to receive and view traffic density information to determine if the region continues to meet their needs.

In addition to determining display space values, the display space management engine 402 can also be used for other applications, including but not limited to:

Optimizing retail store layouts by comparing popular and unpopular routes through the store, for example;
Identifying repeat and new customers based on biometric data; and
Measuring product shelf inventory and providing notifications when inventory is low.

In FIG. 4, two merchant devices are shown by way of example. In general, more than two merchant devices may be in communication with the display space management engine 402. As such, numerous different retail merchants and product merchants can communicate with the display space management engine 402 to manage and purchase display space in the retail store 401 and/or other locations.

Figure 5:
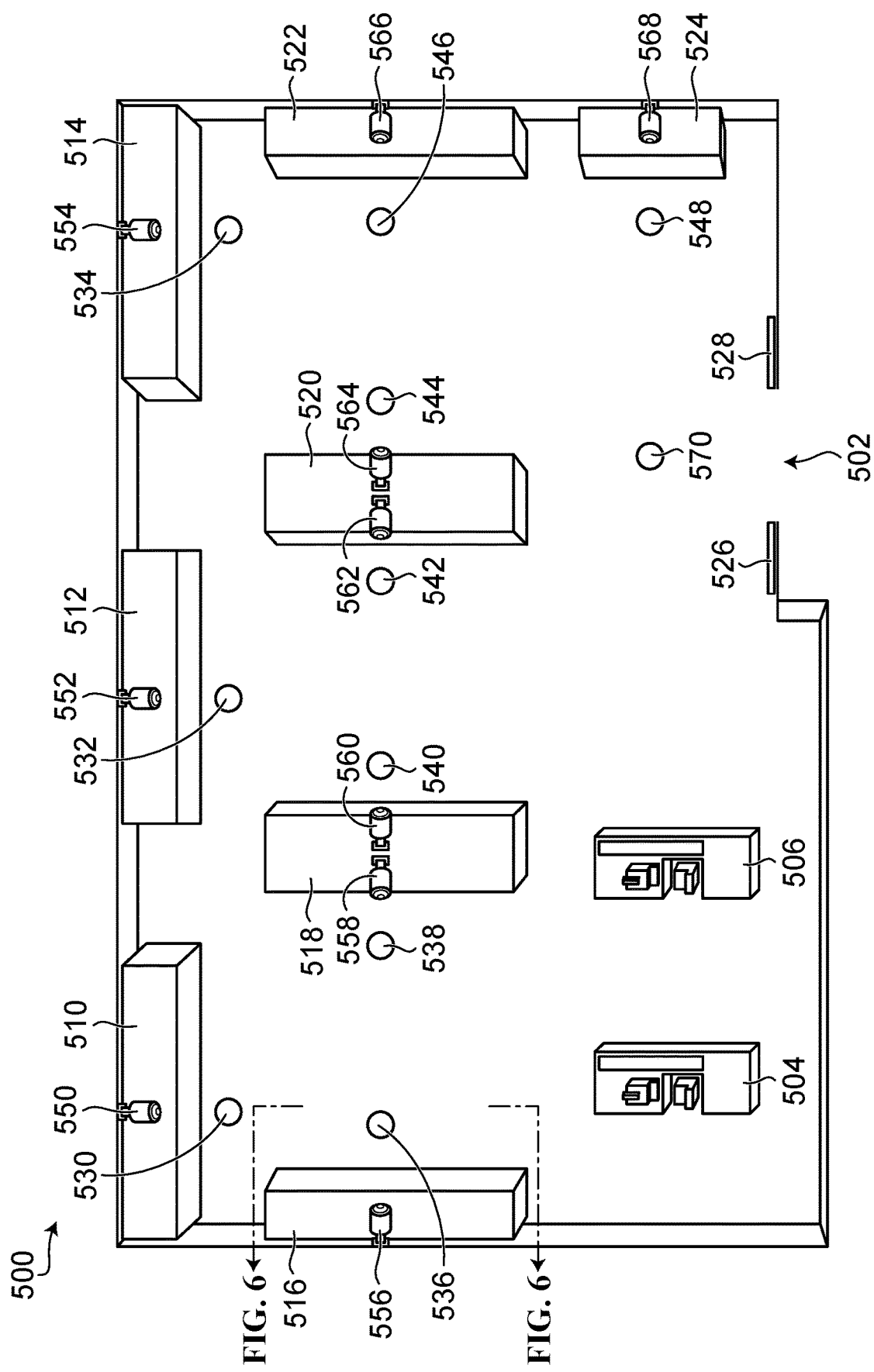
FIG. 5 illustrates a layout of a retail store, according to one embodiment.

An example implementation of sensors in a retail store is shown in FIG. 5, which illustrates a layout of a retail store 500. The retail store 500 includes: an entrance 502; two cashier desks 504, 506; multiple shelving units 510, 512, 514, 516, 518, 520, 522, 524; two window displays 526, 528; and multiple sensors 530, 532, 534, 536, 538, 540, 542, 544, 546, 548, 550, 552, 554, 556, 558, 560, 562, 564, 566, 568, 570. The retail store 500 generally has a grid-like architecture, but other retail stores may have different architectures such as herringbone, loop (or racetrack) and free-flow architectures, for example.

Figure 6:
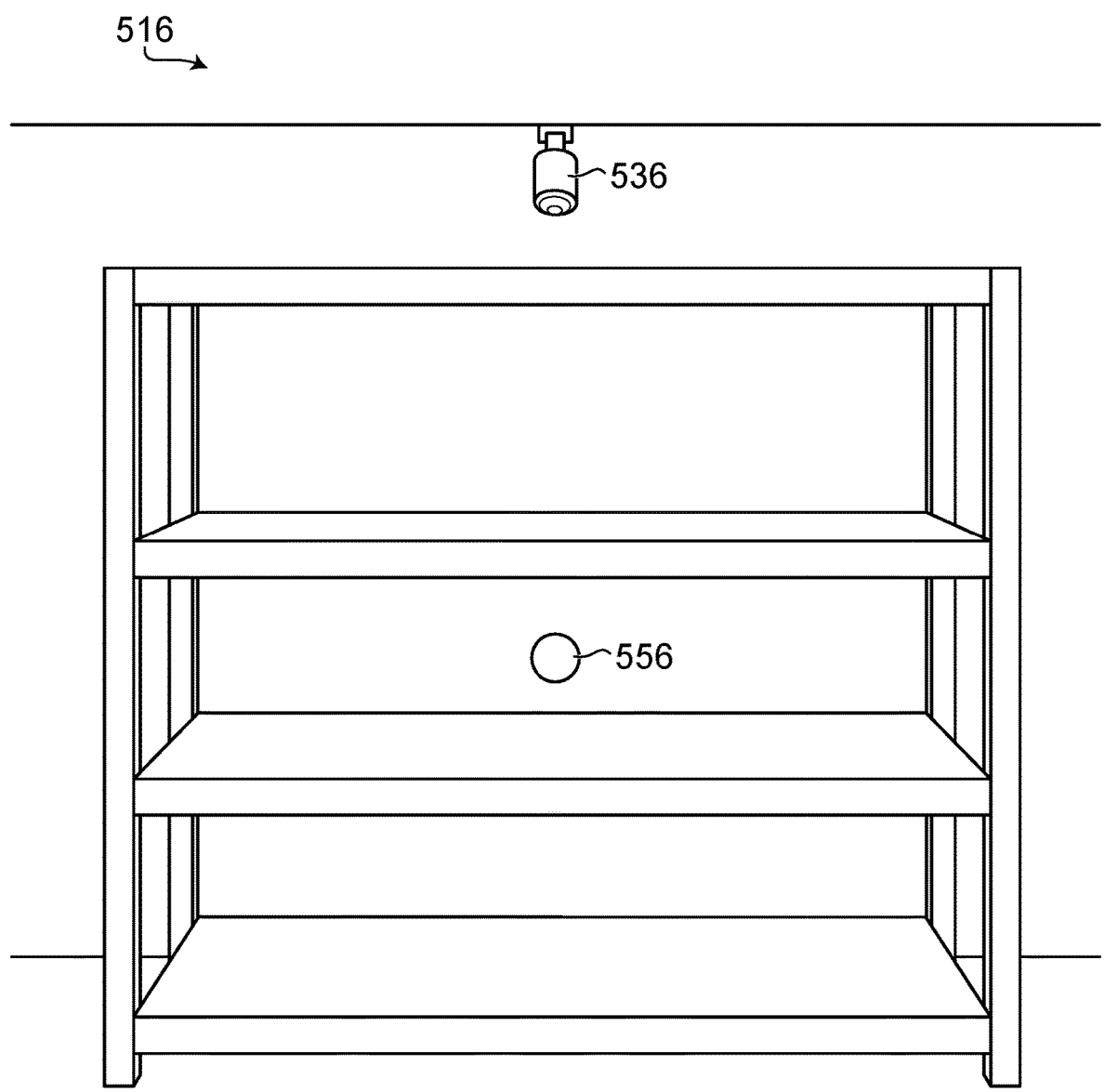
FIG. 6 is a side-view of a shelving unit shown in FIG. 5.

Each of the shelving units 510, 512, 514, 516, 518, 520, 522, 524 are for holding and displaying products. The shelving units 510, 512, 514, 516, 518, 520, 522, 524 include shelf space that can be sold or leased to product merchants in some implementations. FIG. 6 is a side-view of the shelving unit 516, which illustrates three shelves that provide shelf space. Any, one, some or all of the other shelving units 510, 512, 514, 518, 520, 522, 524 could be similar to the shelving unit 516.

The window displays 526, 528 are areas in which advertisements can be placed and displayed to customers. As such, the window displays 526, 528 provide advertising space that can be sold or leased to product merchants in some implementations.

The sensors 530, 532, 534, 536, 538, 540, 542, 544, 546, 548, 550, 552, 554, 556, 558, 560, 562, 564, 566, 568, 570 are provided to obtain measurements within the retail store 500. The sensors 530, 532, 534, 536, 538, 540, 542, 544, 546, 548, 550, 552, 554, 556, 558, 560, 562, 564, 566, 568, 570 provide one example implementation of the sensor(s) 420 of FIG. 4. As such, the retail store 500 could be an example of the retail store 401 of FIG. 4.

The sensors 530, 532, 534, 536, 538, 540, 542, 544, 546, 548, 550, 552, 554, 556, 558, 560, 562, 564, 566, 568, 570 might all be of the same type or might be of multiple different types. Moreover, sensors that are of the same type might be configured in the same way or in different ways. For example, different radar sensors could be configured with the same parameters or could be independently configured with different parameters.

The sensors 530, 532, 534, 536, 538, 540, 542, 544, 546, 548, 570 are provided on or in the ceiling of the retail store 500. By way of example, the sensor 536 is shown connected to the ceiling of the retail store 500 in FIG. 6. However, one or more of the sensors 530, 532, 534, 536, 538, 540, 542, 544, 546, 548, 570 could instead be positioned behind a suitable ceiling tile of the retail store 500. A suitable ceiling tile of the retail store 500 may, for example, be a ceiling tile formed of material(s) having dielectric properties selected so as to not interfere with sensors positioned behind the tile. Each of the sensors 530, 532, 534, 536, 538, 540, 542, 544, 546, 548, 570 can provide top-down spatial measurements of a respective area of the retail store 500. These measurements may be consolidated and analysed to provide a 2D spatial map of the retail store 500. The sensors 530, 532, 534, 536, 538, 540, 542, 544, 546, 548, 570 are positioned in the retail store 500 as follows:

The sensor 530 is positioned to acquire top-down spatial measurements of an area proximate the shelving unit 510;
The sensor 532 is positioned to acquire top-down spatial measurements of an area proximate the shelving unit 512;
The sensor 534 is positioned to acquire top-down spatial measurements of an area proximate the shelving unit 514;
The sensor 536 is positioned to acquire top-down spatial measurements of an area proximate the shelving unit 516;
The sensors 538, 540 are positioned to acquire top-down spatial measurements of areas proximate the shelving unit 518;
The sensors 542, 544 are positioned to acquire top-down spatial measurements of areas proximate the shelving unit 520;
The sensor 546 is positioned to acquire top-down spatial measurements of an area proximate the shelving unit 522;
The sensor 548 is positioned to acquire top-down spatial measurements of an area proximate the shelving unit 524; and The sensor 570 is positioned to acquire top-down spatial measurements of an area proximate the entrance 502 and the window displays 526, 528.

Each of the sensors 550, 552, 554, 556, 558, 560, 562, 564, 566, 568 are provided behind or within one of the shelving units 510, 512, 514, 516, 518, 520, 522, 524 and measure the retail store 500 in the horizontal or lateral direction. By way of example, FIG. 6 shows the sensor 556 positioned behind the shelving unit 516. The sensors 550, 552, 554, 556, 558, 560, 562, 564, 566, 568 are positioned in the retail store 500 as follows:

The sensor 550 is positioned to acquire lateral spatial measurements of an area proximate the shelving unit 510;

The sensor 552 is positioned to acquire lateral spatial measurements of an area proximate the shelving unit 512;

The sensor 554 is positioned to acquire lateral spatial measurements of an area proximate the shelving unit 514;

The sensor 556 is positioned to acquire lateral spatial measurements of an area proximate the shelving unit 516;

The sensors 558, 560 are positioned to acquire lateral spatial measurements of areas proximate the shelving unit 518;

The sensors 562, 564 are positioned to acquire lateral spatial measurements of areas proximate the shelving unit 520;

The sensor 566 is positioned to acquire lateral spatial measurements of an area proximate the shelving unit 522; and The sensor 568 is positioned to acquire lateral spatial measurements of an area proximate the shelving unit 524.

The sensors 530, 532, 534, 536, 538, 540, 542, 544, 546, 548, 570 measure the retail store 500 in the vertical direction, whereas the sensors 550, 552, 554, 556, 558, 560, 562, 564, 566, 568 measure the retail store 500 in the lateral direction. Advantageously, these different sensor orientations may provide complimentary measurements of the retail store 500. For example, there may be overlap in the areas measured by the sensors 536, 556, as each of the sensors 536, 556 measures the area proximate the shelving unit 516, but from a different perspective. Calibration of the sensors 536, 556 could be performed to determine this overlap and account for the overlap during measurement analysis, which may improve the overall quality of the measurements. By way of example, exploiting the redundancy of the sensors 536, 556 during measurement analysis could provide 3D spatial data points for the area proximate the shelving unit 516 and/or improve the accuracy of the measurements for the area proximate the shelving unit 516.

The sensors 530, 532, 534, 536, 538, 540, 542, 544, 546, 548, 550, 552, 554, 556, 558, 560, 562, 564, 566, 568, 570 are in communication with a display space management engine (not shown), which receives measurements from the sensors and analyses the measurements to determine traffic densities and values of display space in the retail store 500. This display space management engine may be similar to the display space management engine 402, for example.

Figure 7:
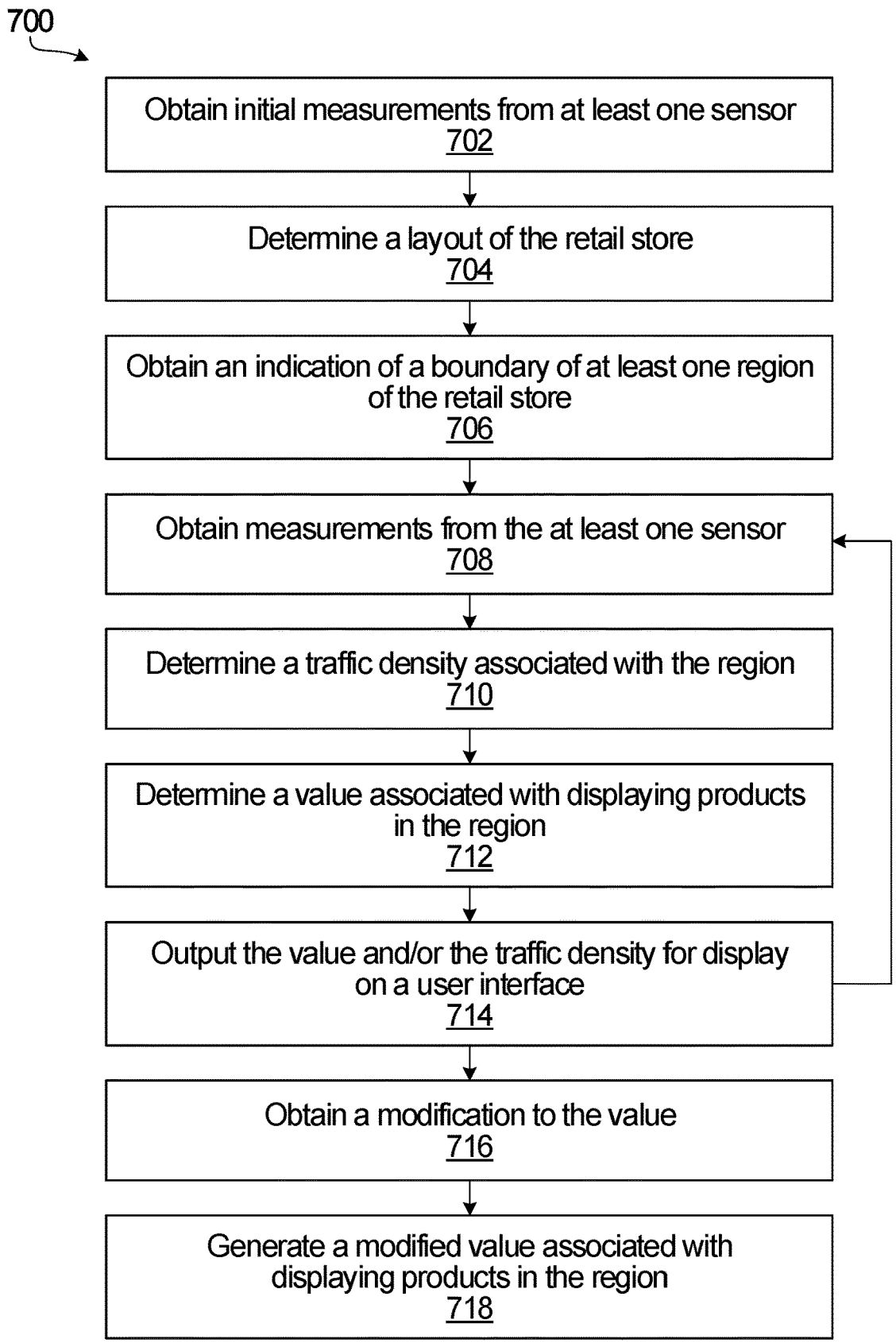
FIG. 7 is a flow diagram illustrating a method for evaluating display space, according to one embodiment.

FIG. 7 is a flow diagram illustrating an example method 700 for evaluating display space. The method 700 will be described as being performed by the display space management engine associated with the retail store 500 of FIG. 5. However, the method 700 is in no way limited to the retail store 500.

In step 702, a processor in the display space management engine obtains initial measurements from any one, some, or all of the sensors 530, 532, 534, 536, 538, 540, 542, 544, 546, 548, 550, 552, 554, 556, 558, 560, 562, 564, 566, 568, 570 when no persons (and optionally no products or shopping carts) are present in the retail store 500. These initial measurements include initial spatial information that pertains to the fixed structures within the retail store 500. The entrance 502, the cashier desks 504, 506, the shelving units 510, 512, 514, 516, 518, 520, 522, 524, the window displays 526, 528, and the walls of the retail store 500 are all examples of fixed structures within the retail store 500. The initial measurements for the retail store 500 could then be stored in a measurement record in the display space management engine.

In step 704, a processor in the display space management engine determines a layout of the retail store 500 (such as the layout illustrated in FIG. 5, for example) based on the initial measurements obtained in step 702. To determine the layout, the processor may analyse the initial measurements using any method disclosed herein to determine the position and shape of objects within the retail store. Because the retail store 500 is empty of any customers, these objects can be interpreted as the fixed structures of the retail store. The layout, which could be determined in 2D or 3D, may indicate the size and position of the entrance 502, the two cashier desks 504, 506, the shelving units 510, 512, 514, 516, 518, 520, 522, 524, the window displays 526, 528, and the walls of the retail store 500. The layout of the retail store 500 may then be stored in a location record in the display space management engine.

In step 706, a processor in the display space management engine obtains an indication of one or more boundaries for the regions of the retail store 500. These boundaries delineate the different regions of the retail store 500, which can tell the display space management engine how the retail store 500 should be divided for the purpose of determining traffic densities and the values of display space, for example. The boundaries for the retail store 500 can be stored in the location record in the display space management engine.

In some implementations, an indication of a boundary could be provided through a user interface by the retail merchant that owns the retail store 500. This user interface may be part of the display space management engine or may be part of a merchant device that is remote from the display space management engine, for example. In some cases, the retail merchant can obtain and view the layout of the retail store 500 determined in step 704 and use this layout to define the boundaries between the different regions of the retail store 500. For example, the layout shown in FIG. 5 could be displayed to the retail merchant though a user interface, along with an option to delineate different regions of the retail store 500 by indicating the virtual boundaries between these regions. Alternately or in addition, an algorithm stored by the display space management engine could automatically select the different regions of the retail store 500 based on the layout and one or more predefined rules or criteria. In an example, an algorithm could recommend boundaries for the different regions of the retail store 500 and present these recommended boundaries, along with a layout of the retail store 500, to the retail merchant via a user interface. The merchant could then view, modify and/or accept the recommended boundaries.

In some implementations, traffic densities are used to aid in the determination of boundaries between different regions. For example, a layout of the retail store 500 could include an indication of traffic densities in various areas of the retail store 500. These traffic densities can be determined based on measurements from the sensors 530, 532, 534, 536, 538, 540, 542, 544, 546, 548, 550, 552, 554, 556, 558, 560, 562, 564, 566, 568, 570 and may be presented as a heat map overlaid with the layout of the retail store 500. A merchant and/or an algorithm could use the traffic density information to help define the boundaries between regions. For example, boundaries may be defined where traffic densities in the retail store 500 cross pre-defined thresholds.

Figure 8:
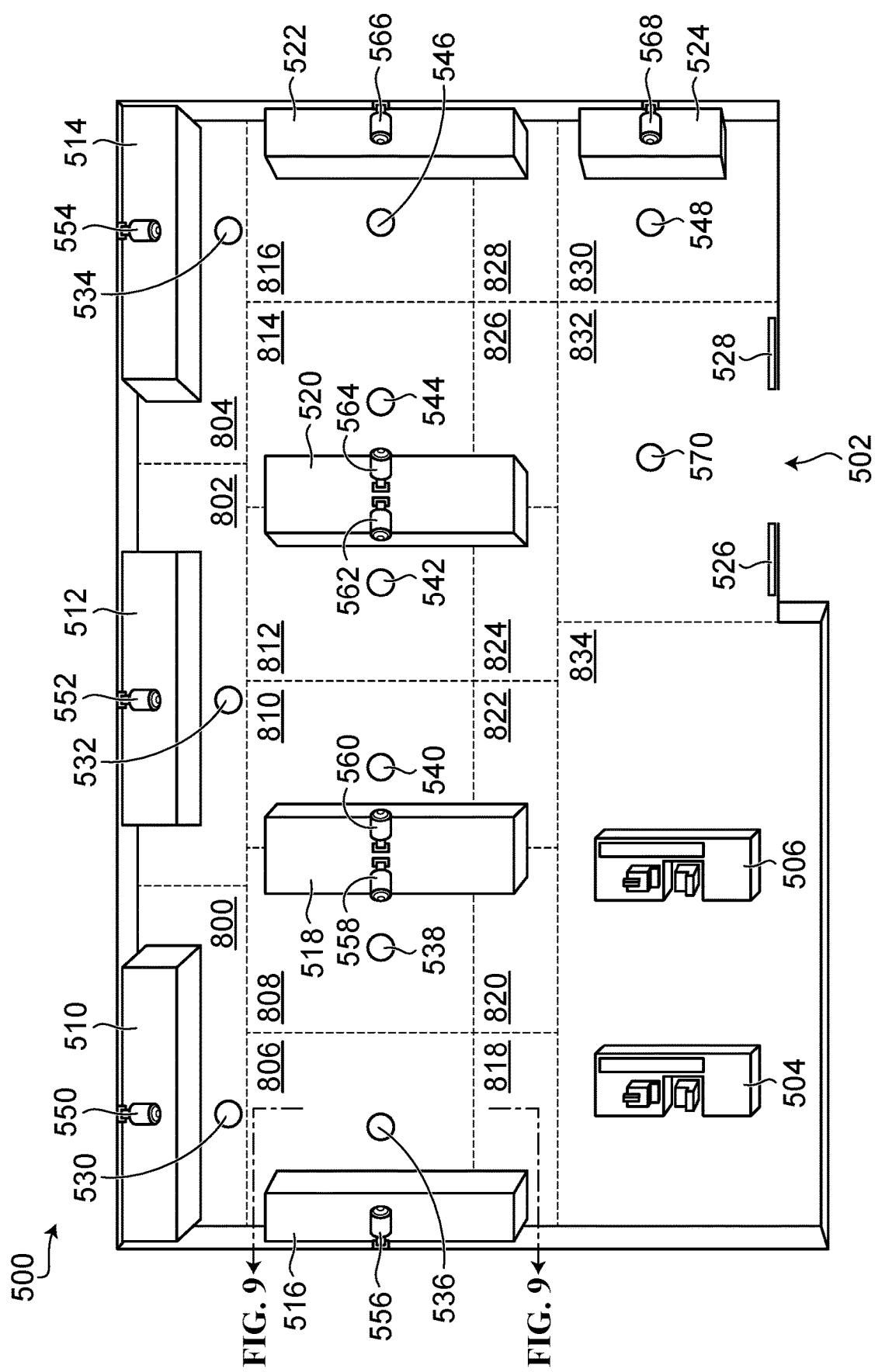
FIG. 8 illustrates a layout of the retail store shown in FIG. 5, with multiple different regions delineated by dashed lines.

FIG. 8 illustrates a layout of the retail store 500 with multiple different regions 800, 802, 804, 806, 808, 810, 812, 814, 816, 818, 820, 822, 824, 826, 828, 830, 832, 834 delineated by dashed lines. These dashed lines are examples of boundaries that may have been obtained in step 708 and are used to define the regions 800, 802, 804, 806, 808, 810, 812, 814, 816, 818, 820, 822, 824, 826, 828, 830, 832, 834. The regions 800, 802, 804, 806, 808, 810, 812, 814, 816, 818, 820, 822, 824, 826, 828, 830, 832, 834 of the retail store 500 are defined as follows:

The region 800 includes the shelving unit 510 and the area proximate the shelving unit 510. The region 800 is measured by at least the sensors 550, 530.

The region 802 includes the shelving unit 512 and the area proximate the shelving unit 512. The region 802 is measured by at least the sensors 552, 532.

The region 804 includes the shelving unit 514 and the area proximate the shelving unit 514. The region 804 is measured by at least the sensors 554, 534.

The shelving unit 516 and the area proximate the shelving unit 516 is divided between the regions 806, 818. The region 818 includes the end of the shelving unit 516 (which could also be considered the end of an aisle) proximate the entrance 502 and the cashier desks 504, 506. The region 806 includes the remainder of the shelving unit 516. The region 818 may have been defined because the end of an aisle is known (through measurements, for example) or is expected to have a higher traffic density than the remainder of the aisle. The regions 806, 818 are measured by at least the sensors 556, 536.

The shelving unit 518 and the area proximate the shelving unit 518 is divided between the regions 808, 810, 820, 822. The regions 808, 820 include one side of the shelving unit 518 and the regions 810, 822 include the other side of the shelving unit 518. Further, the regions 820, 822 include the end of the shelving unit 518 proximate the entrance 502 and the cashier desks 504, 506, and the regions 808, 810 include the remainder of the shelving unit 518. The regions 808, 820 are measured by at least the sensors 558, 538, and the regions 810, 822 are measured by at least the sensors 560, 540.

The shelving unit 520 and the area proximate the shelving unit 520 is divided between the regions 812, 814, 824, 826. The regions 812, 824 include one side of the shelving unit 520 and the regions 814, 826 include the other side of the shelving unit 520. Further, the regions 824, 826 include the end of the shelving unit 520 proximate the entrance 502 and the cashier desks 504, 506, and the regions 812, 814 include the remainder of the shelving unit 520. The regions 812, 824 are measured by at least the sensors 562, 542, and the regions 814, 826 are measured by at least the sensors 564, 544.

The shelving unit 522 and the area proximate the shelving unit 522 is divided between the regions 816, 828. The region 828 includes the end of the shelving unit 522 proximate the entrance 502 and the cashier desks 504, 506. The region 816 includes the remainder of the shelving unit 522. The regions 816, 828 are measured by at least the sensors 566, 546.

The region 830 includes the shelving unit 524 and the area proximate the shelving unit 524. The region 830 is measured by at least the sensors 568, 548.

The region 832 includes the entrance 502 and the window displays 526, 528. The region 832 is measured by at least the sensor 570.

Figure 9:
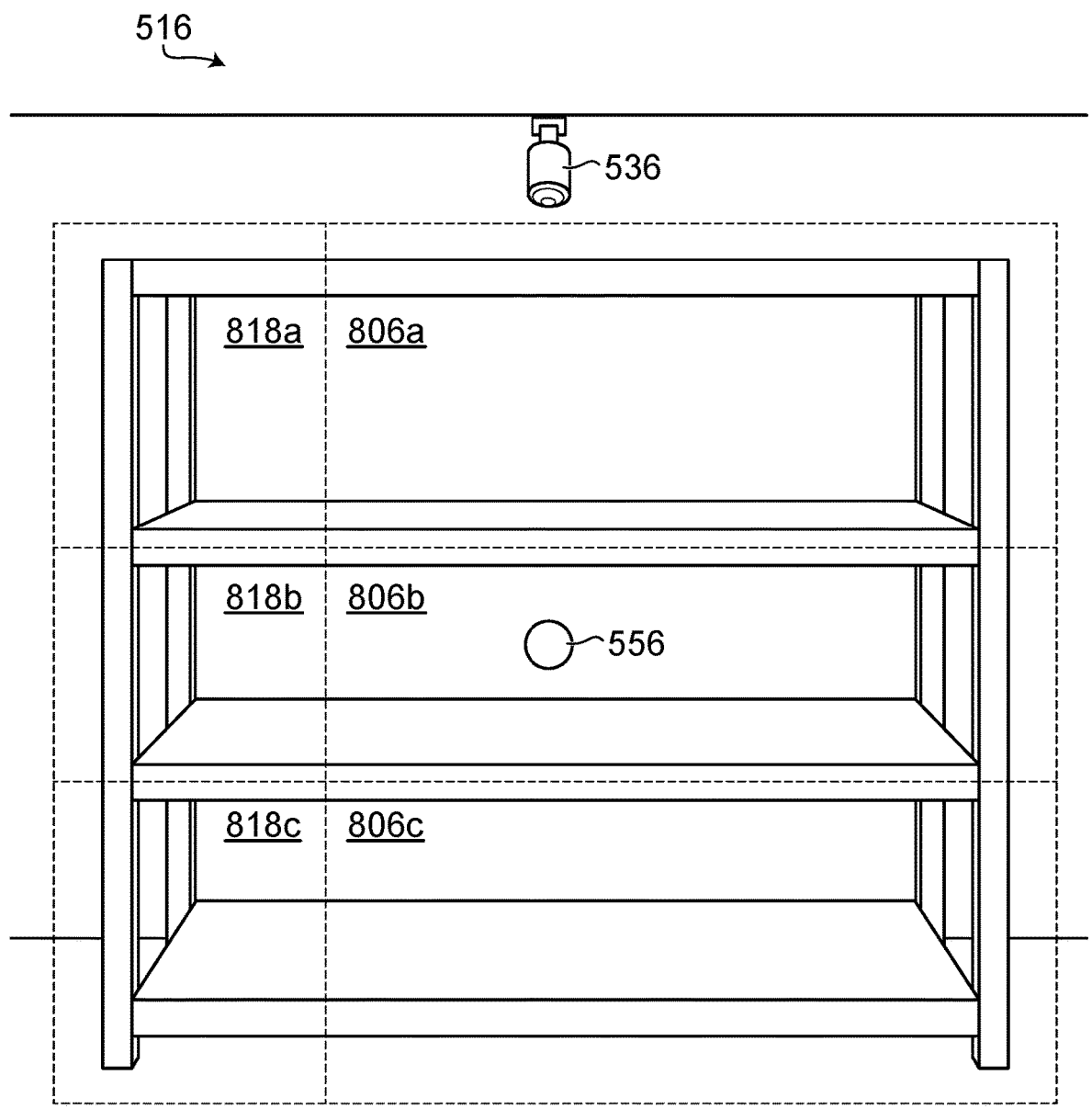
FIG. 9 is a side-view of the shelving unit shown in FIG. 6 and two of the regions shown in FIG. 8.

While FIG. 8 only shows regions defined in 2D, regions can also be defined in 3D. FIG. 9 is a side-view of the shelving unit 516 and the regions 806, 818. The region 806 is divided into subregions 806a, 806b, 806c using dashed lines, wherein each subregion 806a, 806b, 806c corresponds to a different shelf of the shelving unit 516. Similarly, the region 818 is divided into subregions 818a, 818b, 818c using dashed lines. The dashed lines shown in FIG. 9 are further examples of boundaries that may have been obtained in step 706 of the method 700. The subregions 806a, 806b, 806c, 818a, 818b, 818c divide the display space in the shelving unit 516 in the vertical dimension. Any, one, some or all of the other regions 800, 802, 804, 808, 810, 812, 814, 816, 820, 822, 824, 826, 828, 830, 832, 834 of the retail store 500 can include similar subregions that delineate display space in the vertical dimension. It should be noted that, as used herein, the terms "subregions" and "regions" are generally equivalent. As such, the subregions 806a, 806b, 806c, 818a, 818b, 818c can also be referred to as regions.

Referring again to FIG. 7, step 708 includes a processor in the display space management engine obtaining measurements from at least one of the sensors 530, 532, 534, 536, 538, 540, 542, 544, 546, 548, 550, 552, 554, 556, 558, 560, 562, 564, 566, 568, 570. These measurements include spatial information pertaining to at least one of the regions 800, 802, 804, 806, 808, 810, 812, 814, 816, 818, 820, 822, 824, 826, 828, 830, 832, 834 of the retail store 500. Unlike in step 702, there may be customers in the retail store 500 during step 708, and therefore the measurements could detect the presence, position, size, shape and/or velocity of customers. Objects such as shopping carts and products could also be measured.

Step 708 will now be described, by way of example, with reference to FIGS. 10 and 11, which show measurements obtained for the regions 806, 818. It should be noted that measurements for any, one, some or all of the other regions 800, 802, 804, 808, 810, 812, 814, 816, 820, 822, 824, 826, 828, 830, 832, 834 could be obtained in a similar manner.

Figure 10:
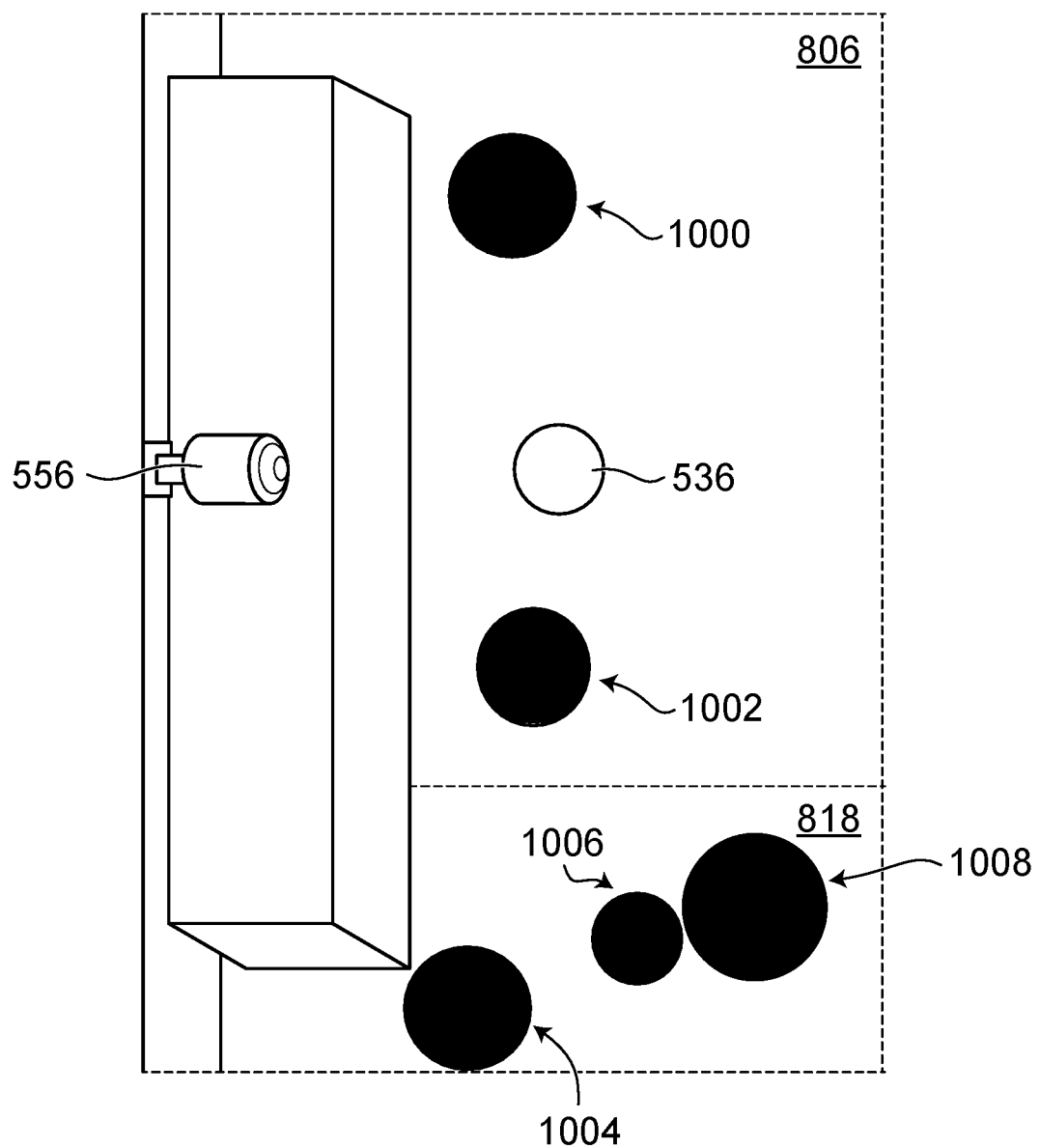
FIG. 10 illustrates a first set of spatial data point clusters in two of the regions shown in FIG. 8.

FIG. 10 illustrates multiple spatial data point clusters 1000, 1002, 1004, 1006, 1008 in the regions 806, 818 of the retail store 800. These spatial data point clusters 1000, 1002, 1004, 1006, 1008 correspond to entities (such as customers and/or objects, for example) that have been measured by one or both of the sensors 556, 536 at a particular point in time. By way of example, in the case that the sensors 556, 536 are radar sensors, each of the spatial data point clusters 1000, 1002, 1004, 1006, 1008 represent multiple points in space that have reflected radio wave pulses emitted from the sensors 556, 536. In some implementations, the spatial data point clusters 1000, 1002, 1004, 1006, 1008 include 3D spatial data points.

Based on the spatial data point clusters 1000, 1002, 1004, 1006, 1008, the position of the entities in the regions 806, 818 can be determined. For example, it can be discerned that two entities are in the region 806, and three entities are in the region 818. The general size of the entities can also be determined based on the spatial data point clusters 1000, 1002, 1004, 1006, 1008. For example, all of the spatial data point clusters 1000, 1004, 1008 are generally the same size, indicating that the corresponding entities are also generally the same size. The entity corresponding to the spatial data point cluster 1006 is the smallest, and the entity corresponding to the spatial data point cluster 1002 is somewhere in between. The speed or velocity of the entities in the regions 806, 818 might also be determined from the spatial data point clusters 1000, 1002, 1004, 1006, 1008.

However, the shape of the entities in the regions 806, 818 cannot be readily determined from the spatial data point clusters 1000, 1002, 1004, 1006, 1008. The spatial data point clusters 1000, 1002, 1004, 1006, 1008 are generally circular, without any recognisable shape. Therefore, it cannot be readily determined what types of entities the spatial data point clusters 1000, 1002, 1004, 1006, 1008 correspond to. When collecting the spatial data point clusters 1000, 1002, 1004, 1006, 1008, the sensors 556, 536 could have been configured to achieve a large range (for example, sensing over the entire area of the regions 806, 818) and/or a high temporal resolution (for example, obtaining measurements in quick succession), which may have come at the cost of reducing the spatial resolution achieved by the sensors 556, 536. Accordingly, the spatial data point clusters 1000, 1002, 1004, 1006, 1008 are examples of coarse measurements that lack the spatial resolution to determine the shape of the entities.

In some implementations, step 708 includes obtaining multiple sets of measurements for an entity in a region, where each measurement is taken with a different sensor configuration. This could provide a broader range of information about the entity. For example, the spatial data point clusters 1000, 1002, 1004, 1006, 1008 could be a first set of measurements for entities in the regions 806, 818. One or both of the sensors 556, 536 could then be adjusted to improve spatial resolution, and a second set of measurements could be obtained.

Figure 11:
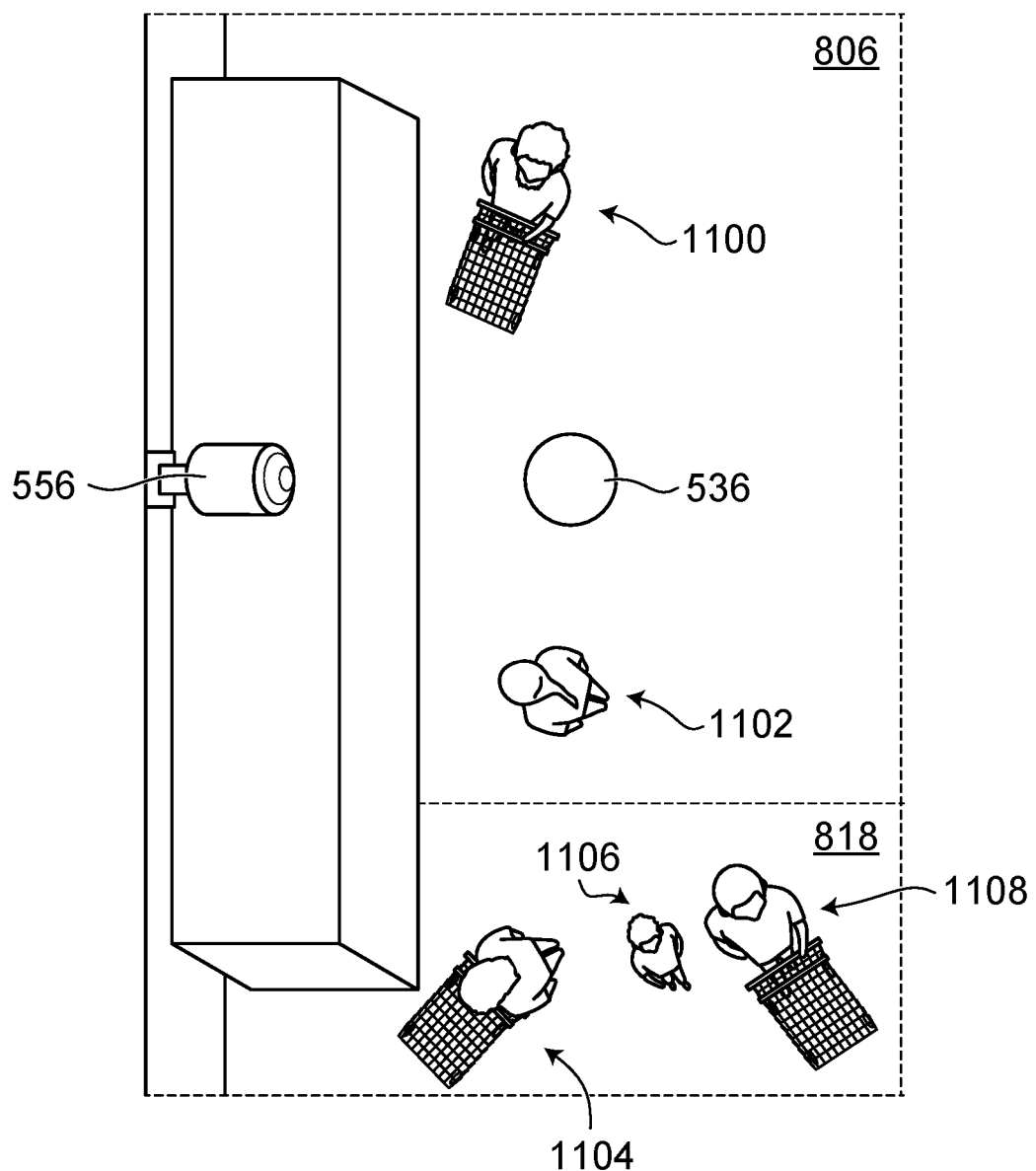
FIG. 11 illustrates a second set of spatial data point clusters in two of the regions shown in FIG. 8.

FIG. 11 illustrates a second set of spatial data point clusters 1100, 1102, 1104, 1106, 1108 in the regions 806, 818 of the retail store 500. The spatial data point clusters 1100, 1102, 1104, 1106, 1108 represent measurements obtained from the sensors 556, 536 after adjusting at least one of the sensors 556, 536 to improve spatial resolution. For example, the first set of spatial data point clusters 1000, 1002, 1004, 1006, 1008 could have been obtained by the sensors 556, 536 scanning the entirety of the regions 806, 818 at a relatively low resolution. After determining the positions of the entities in the regions 806, 818 based on the spatial data point clusters 1000, 1002, 1004, 1006, 1008, the spatial data point clusters 1100, 1102, 1104, 1106, 1108 could have been obtained by the sensors 556, 536 scanning only the areas around the entities at a relatively high resolution.

Adjusting sensors can include, but is not limited to, adjusting the parameters of the sensors. Adjusting sensors can also or instead include switching between different sensors with different capabilities. For example, the spatial data point clusters 1000, 1002, 1004, 1006, 1008 could have been obtained from the sensor 556, and the spatial data point clusters 1100, 1102, 1104, 1106, 1108 could have been obtained from the sensor 536. Alternatively, either or both of the sensors 556, 536 could actually be a collection of multiple sensors with different capabilities and that can be turned on or off depending on the situation.

As shown in FIG. 11, the spatial data point clusters 1100, 1102, 1104, 1106, 1108 provide the shape of the entities in the regions 806, 818. For example, the spatial data point clusters 1100, 1104, 1108 each define an adult customer with a shopping cart. In some implementations, the shopping carts provided by the retail store 500 could be formed from material with high dielectric constants so that they are more easily detected by a radar sensor, for example. The spatial data point cluster 1102 defines an adult customer without a shopping cart, and the spatial data point cluster 1106 defines a child customer.

In some implementations, the spatial data point clusters 1100, 1102, 1104, 1106, 1108 have a sufficient spatial resolution to outline the anatomical features of the customers. Therefore, some actions of the customers in the regions 806, 818 could be detected based, in part, on the spatial data point clusters 1100, 1102, 1104, 1106, 1108. In an example, the spatial data point cluster 1102 could show the corresponding customer reaching towards the subregion 806b and interacting with a product.

Referring again to step 708 of FIG. 7, measurements could be obtained continuously or intermittently over a period of time. For example, the spatial data point clusters 1000, 1002, 1004, 1006, 1008, 1100, 1102, 1104, 1106, 1108 could be measurements of the regions 806, 818 that are taken at one-point in time. Further measurements could then be taken at fixed intervals thereafter. As such, the measurements obtained in step 708 could include measurements obtained over a period of hours, day, weeks, months or years, for example. Any, some or all of the measurements obtained in step 708 can be stored in a measurement record in the display space management engine.

In step 710, a processor in the display space management engine determines, based on the measurements obtained in step 708, a traffic density associated with at least one of the regions 800, 802, 804, 806, 808, 810, 812, 814, 816, 818, 820, 822, 824, 826, 828, 830, 832, 834 of the retail store 500. Furthermore, traffic densities can be determined for each subregion in the regions 800, 802, 804, 806, 808, 810, 812, 814, 816, 818, 820, 822, 824, 826, 828, 830, 832, 834, including the subregions 806a, 806b, 806c, 818a, 818b, 818c. For example, customer actions could be used to determine which of the subregions 806a, 806b, 806c a customer is interacting with when standing in the region 806. Any, some or all of the traffic densities obtained in step 710 can be stored in a traffic density record in the display space management engine.

A traffic density could be determined in step 710 using any method disclosed herein. For a given region of the retail store 500, step 710 may include (but is not limited to) any, one, some or all of the following operations:

- determining a number of persons that enter the region over a period of time;
- determining an average time that a person spends in the region;
- determining a number of shopping carts that enter the region over the period of time; and
- determining a number of persons that interact with products in the region over the period of time.

In some cases, a traffic density is determined based on the layout determined in step 704. Using the layout, the processor can compare the measurements obtained in step 708 to the position of the fixed structures in the retail store 500. Any measurements that correspond to the fixed structures in the retail store 500 can then be disregarded. Therefore, the traffic densities determined in step 710 can be limited to the customers, shopping carts and optionally products in the retail store 500.

In some implementations, step 710 can include tracking the movement of customers through the retail store 500. The typical paths taken by customers in the retail store 500 may be used to help determine the traffic densities in the retail store 500. The paths can also indicate the desirability of some products in the retail store 500. Customers may travel a further distance and spend a longer time looking for more desirable products. By way of example, staple grocery store products such as eggs and milk can be displayed in a region relatively far from the entrance of the grocery store because customers will often travel the length of the store to reach these staple products. In this example, the route taken by customers can be determined in step 710, and the traffic densities for regions within this route may be determined accordingly. Further, this information can help a merchant determine where to place their staple products to increase the portion of the retail store that customers will traverse to reach the staple products.

In step 712, a processor in the display space management engine determines, based on the traffic density (or densities) determined in step 710, a value associated with displaying products in at least one of the regions 800, 802, 804, 806, 808, 810, 812, 814, 816, 818, 820, 822, 824, 826, 828, 830, 832, 834 of the retail store 500. Values of display space can also be determined for subregions of the regions 800, 802, 804, 806, 808, 810, 812, 814, 816, 818, 820, 822, 824, 826, 828, 830, 832, 834, including the subregions 806a, 806b, 806c, 818a, 818b, 818c. Accordingly, each of the different regions and subregions in the retail store 500 can have different values of display space.

In some implementations, a cost of purchasing or leasing shelf space in the shelving units 510, 512, 514, 516, 518, 520, 522, 524 is determined in step 712. Furthermore, the cost of purchasing or leasing advertising space in the window displays 526, 528 can be determined in step 712. Any, some or all of the values of display space determined in step 712 can be stored in a display space value record in the display space management engine.

Step 712 could be performed using any method disclosed herein. In some implementations, step 712 includes comparing the traffic densities of any two or more of the regions 800, 802, 804, 806, 808, 810, 812, 814, 816, 818, 820, 822, 824, 826, 828, 830, 832, 834, and determining the value of display space in these regions based on the comparison. In other implementations, multiple traffic density thresholds are defined and values of display space in a region are determined based on the traffic density thresholds that are exceeded by the region.

In step 714, a processor in the display space management engine can output the values of display space determined in step 712 for display on a user interface. The display space management engine can also (or instead) output the traffic densities determined in step 710 for display on the user interface. The user interface may be part of the display space management engine or part of a merchant device that is associated with a product merchant or a retail merchant, for example. As such, step 714 can include transmitting values of display space and/or traffic densities to a merchant device. To obtain the values of display space and/or the traffic densities, the processor may query the traffic density record and/or the display space value record in the display space management engine.

A retail merchant may use the information output in step 714 to decide how to price the display space in the retail store 500. Further, the information could allow the retail merchant to improve the layout of the retail store 500 to increase traffic densities, values of display space and/or overall sales in the retail store 500. Improving the layout of the retail store 500 could include moving the fixed structures within the retail store 500 and/or improving the organization of products in the retail store 500, for example. In some implementations, an improved layout may be generated by one or more models stored in the display space management engine. The retail merchant that owns the retail store 500 may also sell products within the retail store 500, and therefore the retail merchant could use the information provided in step 714 to decide where to display their products.

A product merchant may use the information output in step 714 to determine whether to purchase or lease display space in the retail store 500, and if so which region of the retail store 500 to purchase display space in. In some cases, a model stored in the display space management engine could recommend certain regions of the retail store 500 to the product merchant based on the merchant's needs and/or to help increase the merchant's sales. If the product merchant already owns or rents display space in the retail store 500, then the product merchant could use the information output in step 714 to determine or confirm that the display space is meeting their needs. For example, a product merchant might want to confirm that the region where their products are displayed receives a certain number of customers per day.

Figure 12:
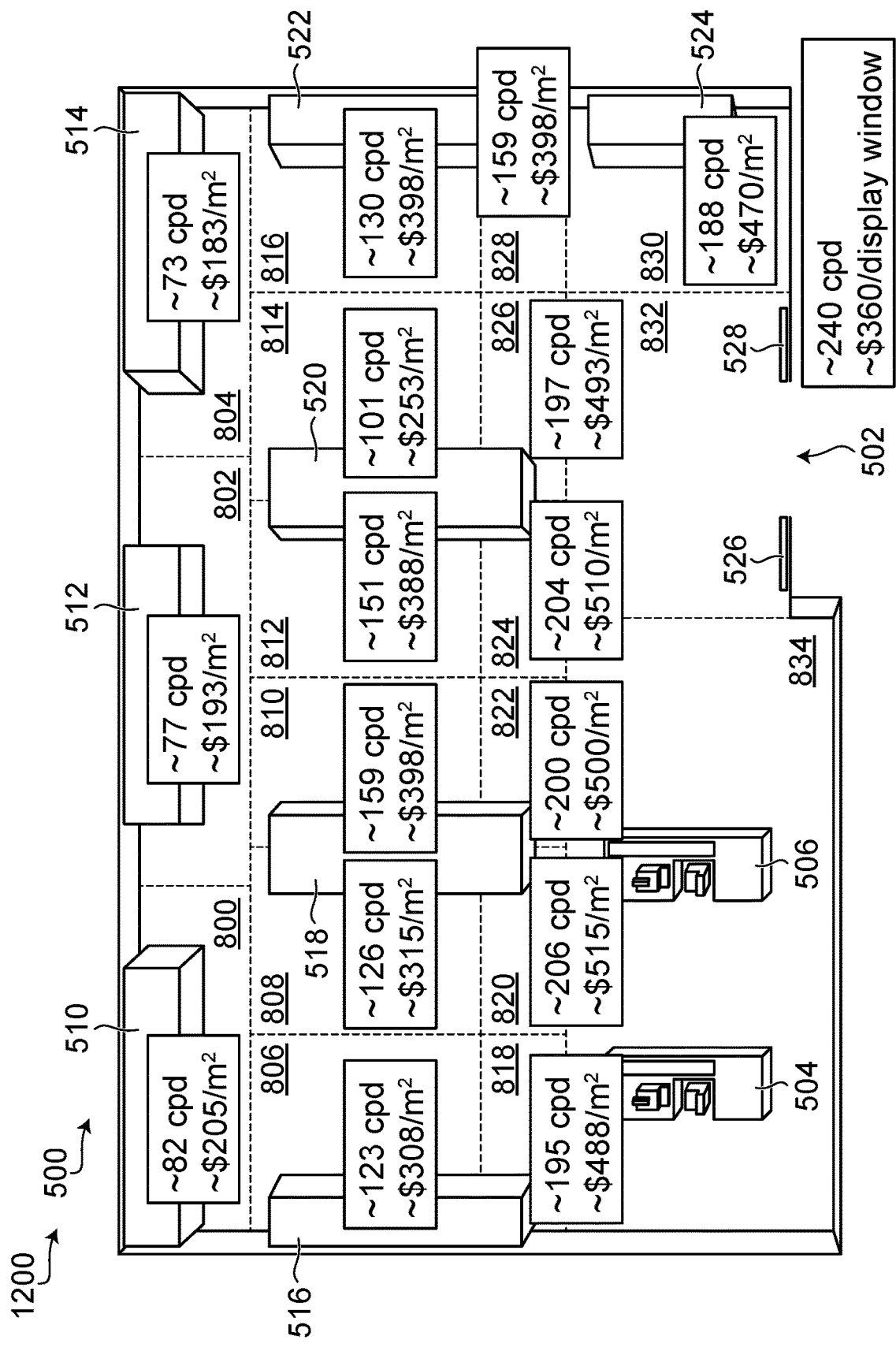
FIG. 12 illustrates content showing traffic densities and values of display space overlaid with the layout of the retail store shown in FIG. 5.

For any region of the retail store 500, a value of display space and a traffic density could be displayed with a representation of the region in step 714. For example, values of display space and traffic densities could be overlaid with, or displayed side-by-side with, a layout of the retail store 500. FIG. 12 illustrates content 1200 showing traffic densities and values of display space overlaid with a layout of the retail store 500. The content 1200 is an example of information that can be generated by the display space management engine and output for display on a user interface in step 714. The content 1200 can allow a merchant (or other user) to visualize traffic densities and values of display space within the retail store 500. The sensors 530, 532, 534, 536, 538, 540, 542, 544, 546, 548, 550, 552, 554, 556, 558, 560, 562, 564, 566, 568, 570 are not shown in FIG. 12 to avoid congestion of the figure.

FIG. 12 shows an average value of traffic density for each region of the retail store 500, as determined in step 710. The average traffic densities are provided in terms of customers per day (cpd), which represents the measured number of customers that interact with products in a particular region in an average day. This is only one example metric for traffic density, and other metrics could also or instead be presented. In general, a merchant (or other user) that is viewing the content 1200 could select one or more metrics for traffic density that can be displayed with the layout of the retail store 500.

FIG. 12 also shows an average value of display space for each region of the retail store 500, as determined in step 712. For the regions that include shelving units, the values of display space are provided in terms of a cost of leasing one square meter of shelving space for a week. For region 832, which includes the window displays 526, 528, the value of display space is provided in terms of leasing one window display for a week.

Average traffic densities and average values of display space are provided in the content 1200 because at least some regions of the retail store 500 can contain multiple subregions. Accordingly, each of these subregions can have a respective value of traffic density and value of display space. For a given region, the average traffic densities and average values of display space shown in the content 1200 represent averages of the traffic densities and values of display space for the different subregions in the region.

Figure 13:
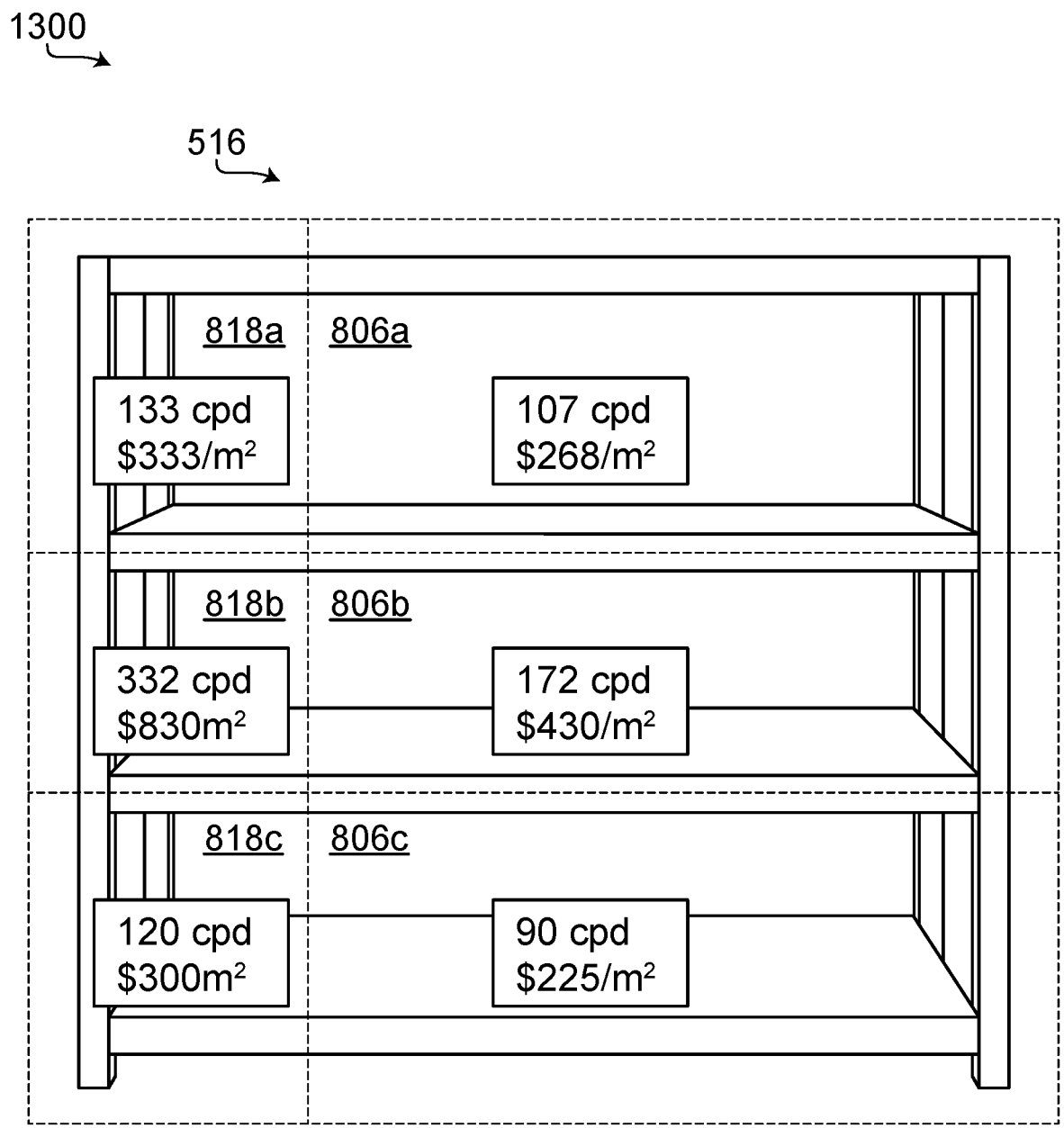
FIG. 13 illustrates content showing traffic densities and values of display space overlaid with the shelving unit shown in FIG. 6.

FIG. 13 illustrates content 1300 showing traffic densities and values of display space overlaid with the shelving unit

516. The content 1300 includes a respective traffic density (in terms of cpd) and a respective value of display space (in terms of a cost of leasing one square meter of shelving space for a week) for each of the subregions 806a, 806b, 806c, 818a, 818b, 818c. FIG. 13 illustrates traffic densities and values of display space that have been determined in 3D based on 3D spatial data points, for example. In some implementations, the content 1300 is transmitted to, and displayed on, a user interface after a merchant selects the shelving unit 516 in the content 1200 via a user interface.

It should be noted that FIGS. 12 and 13 provide only one way to characterize and present traffic densities and display space values, and many others are contemplated. For example, traffic densities and/or display space values could instead be presented as a heat map overlaid with a layout of the retail store 500. In some implementations, other information could also be presented with a layout of the retail store 500, an example of which is the sales conversion percentage for a given product on a shelf.

Steps 708, 710, 712, 714 can be repeated several times, which is shown using the arrow from step 714 to step 708 in FIG. 7. As new measurements become available, traffic densities and values of display space can be updated to reflect the new measurements. The new measurements can detect changes in customer patterns, changes to the layout of the retail store 500 and changes to the products displayed in the retail store 500. Accordingly, repeating steps 708, 710, 712, 714 can provide merchants with traffic densities and display space values based on the most relevant information available.

In step 716, a processor in the display management engine obtains a modification to one or more of the values of display space output in step 714. For example, after viewing the traffic densities and values of display space for the retail store 500, the retail merchant that owns the retail store 500 could choose to modify one or more of the values of display space. In some cases, this modification is generated by a user interface on a merchant device and is transmitted to the display space management engine. Based on the modification obtained in step 716, a processor in the display space evaluation engine generates one or more modified values of display space in step 718. In some implementations, step 718 includes modifying the values of display space stored in a display space value record. The modified values of display space can then be outputted for display on a user interface. For example, the content 1200, 1300 can be updated to reflect the modified values of display space.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
obtaining initial radio wave measurements from at least one radar sensor deployed in a retail store, the initial radio wave measurements obtained from the at least one radar sensor comprising initial spatial information pertaining to fixed structures within a region of the retail store, and the initial radio wave measurements obtained when no persons are present in the region of the retail store;
subsequent to obtaining the initial radio wave measurements: obtaining additional radio wave measurements from the at least one radar sensor deployed in the retail store, the additional radio wave measurements obtained over a period of time using the at least one radar sensor to capture customer activity in the region of the retail store, wherein obtaining the additional radio wave measurements includes obtaining, from the at least one radar sensor, a first measurement of a customer that is in the region, adjusting the at least one radar sensor based on the first measurement and after adjusting the at least one radar sensor, obtaining a second measurement of the customer; wherein the additional radio wave measurements comprise additional spatial information pertaining to the region of the retail store, the additional spatial information associated with at least one of presence, position, size, shape, and/or velocity of entities including customers in the region of the retail store without personally identifying the customers;
determining, based on the initial radio wave measurements and the additional radio wave measurements, a traffic density associated with the region, the determining including comparing at least some of the additional radio wave measurements to at least some of the initial radio wave measurements to disregard measurements that correspond to the fixed structures to limit the traffic density to exclude the fixed structures; and
determining, based on the traffic density, a value associated with displaying products in the region.

2. The computer-implemented method of claim 1, wherein:
the region is a first region, the traffic density is a first traffic density and the value is a first value;
the initial spatial information pertains to fixed structures within a plurality of regions of the retail store, the plurality of regions including the first region and a second region;
the additional spatial information pertains to the plurality of regions of the retail store; and
the computer-implemented method further comprises:
determining, based on the initial radio wave measurements and the additional radio wave measurements, a second traffic density associated with the second region.

3. The computer-implemented method of claim 2, wherein determining the first value comprises comparing the first traffic density to the second traffic density.

4. The computer-implemented method of claim 2, further comprising:
determining, based on the second traffic density, a second value associated with displaying products in the second region.

5. The computer-implemented method of claim 1, wherein determining the traffic density comprises at least one of:
determining a number of persons that enter the region over the period of time;
determining an average time that a person spends in the region;
determining a number of shopping carts that enter the region over the period of time; and
determining a number of persons that interact with products in the region over the period of time.

6. The computer-implemented method of claim 1, wherein adjusting the at least one radar sensor comprises adjusting a resolution of the at least one radar sensor.

7. The computer-implemented method of claim 1, wherein the initial spatial information and the additional spatial information comprises three-dimensional information.

8. The computer-implemented method of claim 1, wherein the additional spatial information comprises at least one of the position, the shape and the velocity of an entity in the region.

9. The computer-implemented method of claim 1, further comprising:
outputting the value for display on a user interface with a representation of the region of the retail store.

10. The computer-implemented method of claim 1, further comprising:
obtaining, from a user interface, a modification to the value; and
generating, based on the modification, a modified value associated with displaying products in the region.

11. The computer-implemented method of claim 1, further comprising:
obtaining, from a user interface, an indication of a boundary of the region of the retail store.

12. The method of claim 1, wherein the determining the traffic density comprises determining a number of the customers in the region over the period of time.

13. The method of claim 1, wherein the initial radio wave measurements and the additional radio wave measurements obtained from the at least one radar sensor comprise spatial data points, each spatial data point corresponding to a measurement from the at least one radar sensor, and wherein a dense collection of the spatial data points indicates the presence of an entity.

14. The method of claim 6, wherein the resolution is a spatial resolution, and wherein the at least one radar sensor is adjusted to have improved spatial resolution to obtain the second measurement of the customer.

15. A system comprising:
memory to store measurements obtained from at least one radar sensor deployed in a retail store; and
at least one processor to:
obtain initial radio wave measurements from the at least one radar sensor deployed in the retail store, the initial radio wave measurements obtained from the at least one radar sensor comprising initial spatial information pertaining to fixed structures within a region of the retail store, and the initial radio wave measurements obtained when no persons are present in the region of the retail store;
subsequent to obtaining the initial radio wave measurements: obtain additional radio wave measurements from the at least one radar sensor deployed in the retail store, the additional radio wave measurements obtained over a period of time using the at least one radar sensor to capture customer activity in the region of the retail store, wherein the at least one processor is to obtain the additional radio wave measurements by performing operations including obtaining, from the at least one radar sensor, a first measurement of a customer that is in the region, adjusting the at least one radar sensor based on the first measurement and after adjusting the at least one radar sensor, obtaining a second measurement of the customer; wherein the additional radio wave measurements comprise additional spatial information pertaining to the region of the retail store, the additional spatial information associated with at least one of presence, position, size, shape, and/or velocity of entities including customers in the region of the retail store without personally identifying the customers;
determine, based on the initial radio wave measurements and the additional radio wave measurements, a traffic density associated with the region, the determining including comparing at least some of the additional radio wave measurements to at least some of the initial radio wave measurements to disregard measurements that correspond to the fixed structures to limit the traffic density to exclude the fixed structures; and
determine, based on the traffic density, a value associated with displaying products in the region.

16. The system of claim 15, wherein:
the region is a first region, the traffic density is a first traffic density and the value is a first value;
the initial spatial information pertains to fixed structures within a plurality of regions of the retail store, the plurality of regions including the first region and a second region;
the additional spatial information pertains to the plurality of regions of the retail store; and the at least one processor is further to determine, based on the initial radio wave measurements and the additional radio wave measurements, a second traffic density associated with the second region.

17. The system of claim 16, wherein the first value is determined based on a comparison of the first traffic density to the second traffic density.

18. The system of claim 16, wherein the at least one processor is further to determine, based on the second traffic density, a second value associated with displaying products in the second region.

19. The system of claim 15, wherein the traffic density comprises at least one of:
 a number of persons that enter the region over the period of time;
 an average time that a person spends in the region;
 a number of shopping carts that enter the region over the period of time; and
 a number of persons that interact with products in the region over the period of time.

20. The system of claim 15, wherein a resolution of the at least one radar sensor is adjusted.

21. The system of claim 15, wherein the initial spatial information and the additional spatial information comprises three-dimensional information.

22. The system of claim 15, wherein the additional spatial information comprises at least one of the position, the shape and the velocity of an entity in the region.

23. The system of claim 15, wherein the at least one processor is further to:
 output the value for display on a user interface with a representation of the region of the retail store.

24. The system of claim 15, wherein the at least one processor is further to:
 obtain, from a user interface, a modification to the value; and
 generate, based on the modification, a modified value associated with displaying products in the region.

25. The system of claim 15, wherein the at least one processor is further to:
 obtain, from a user interface, an indication of a boundary of the region of the retail store.

26. The system of claim 15, wherein the at least one processor is to determine the traffic density by performing operations including determining a number of the customers in the region over the period of time.

27. The system of claim 15, wherein the initial radio wave measurements and the additional radio wave measurements obtained from the at least one radar sensor comprise spatial data points, each spatial data point corresponding to a measurement from the at least one radar sensor, and wherein a dense collection of the spatial data points indicates the presence of an entity.

28. The system of claim 20, wherein the resolution is a spatial resolution, and wherein the at least one radar sensor is adjusted to have improved spatial resolution to obtain the second measurement of the customer.

* * * * *